United States Patent
Zhou et al.

(10) Patent No.: US 12,092,819 B2
(45) Date of Patent: Sep. 17, 2024

(54) HEAD-UP DISPLAY AND HEAD-UP DISPLAY METHOD

(71) Applicant: Huawei Technologies Co., Ltd., Shenzhen (CN)

(72) Inventors: Pengcheng Zhou, Shanghai (CN); Yuteng Zhang, Shenzhen (CN); Hai Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/310,179

(22) Filed: May 1, 2023

(65) Prior Publication Data

US 2023/0266588 A1    Aug. 24, 2023

Related U.S. Application Data

(63) Continuation of application No. PCT/CN2020/125684, filed on Oct. 31, 2020.

(51) Int. Cl.
  *G02B 27/01*    (2006.01)
  *B60K 35/00*    (2024.01)
  *B60K 35/23*    (2024.01)

(52) U.S. Cl.
  CPC .......... *G02B 27/0101* (2013.01); *B60K 35/00* (2013.01); *B60K 35/23* (2024.01); *B60K 2360/23* (2024.01); *B60K 2360/31* (2024.01)

(58) Field of Classification Search
  None
  See application file for complete search history.

(56) References Cited

U.S. PATENT DOCUMENTS

| | | | |
|---|---|---|---|
| 2011/0141223 A1* | 6/2011 | Choe | H04N 23/55 348/36 |
| 2018/0129042 A1 | 5/2018 | Yamazoe et al. | |
| 2018/0306400 A1* | 10/2018 | Muegge | F21S 43/30 |
| 2020/0317053 A1 | 10/2020 | Kikuchi | |
| 2021/0103151 A1 | 4/2021 | Okayama et al. | |

FOREIGN PATENT DOCUMENTS

| | | | | |
|---|---|---|---|---|
| CN | 102227666 B | * | 11/2013 | ......... G02B 13/0045 |
| CN | 210348060 U | | 4/2020 | |
| WO | 2018116896 A1 | | 6/2018 | |
| WO | 2020032095 A1 | | 2/2020 | |

* cited by examiner

*Primary Examiner* — Duane N Taylor, Jr.
(74) *Attorney, Agent, or Firm* — Conley Rose, P.C.

(57) ABSTRACT

A head-up display includes a picture generation unit and a first lens. The picture generation unit is configured to output a first light ray and a second light ray. The first light ray is used to output and display a first picture, and the second light ray is used to output and display a second picture. When the first lens is at the first position, the first light ray and the second light ray do not pass through the first lens. When the first lens is at the second position, the first light ray passes through the first lens. The head-up display can implement switching between a single image plane and a plurality of image planes.

20 Claims, 13 Drawing Sheets

HEAD-UP DISPLAY AND HEAD-UP DISPLAY METHOD

CROSS-REFERENCE TO RELATED APPLICATIONS

This is a continuation of International Patent Application No. PCT/CN2020/125684, filed on Oct. 31, 2020, the disclosure of which is hereby incorporated by reference in its entirety.

TECHNICAL FIELD

This application relates to the field of head-up display technologies, and in particular, to a head-up display and a head-up display method.

BACKGROUND

A head-up display (HUD) is a display apparatus that projects a picture onto a forward field of view of a driver. In comparison with display through a conventional instrument and a central control screen, the driver does not need to lower the head when observing a HUD picture. This avoids switching a line of sight between a picture and a road surface, reduces a crisis response time, and improves driving safety.

As HUD application scenarios continuously expand, researchers propose a dual-focus HUD. This technology can image a picture on two image planes. For example, an instrument picture is displayed on an image plane that is close to the front of the driver, and a navigation line picture is displayed on an image plane that is away from the front of the driver.

Currently, a single HUD can image a picture on one image plane or two image planes. However, in the conventional technology, picture imaging switching between a single image plane and two image planes cannot be implemented through a single HUD.

SUMMARY

Embodiments of this application provide a head-up display and a head-up display method. The head-up display includes a picture generation unit, a reflector combination, and a removable lens combination. The picture generation unit is configured to emit a light ray of a target picture to the reflector combination. The light ray is reflected to a windshield through the reflector combination. A virtual image of the target picture is generated on a side that is of the windshield and that is away from the reflector combination. In the method, a visual distance of the virtual image of the target picture may be changed when the removable lens combination is at a target position. The target picture may include one or more pictures. This implements switching between a single image plane and a plurality of image planes and improves user experience.

According to a first aspect, an embodiment of this application provides a head-up display, including: a picture generation unit, configured to output a first light ray and a second light ray, where the first light ray is used to output and display a first picture, and the second light ray is used to output and display a second picture; and a first lens, configured to move from a first position to a second position under driving of a first drive circuit, where when the first lens is at the first position, the first light ray and the second light ray do not pass through the first lens, and when the first lens is at the second position, the first light ray passes through the first lens, so that a visual distance of a virtual image of the first picture is not equal to a visual distance of a virtual image of the second picture.

With reference to the first aspect, in some possible embodiments, the head-up display further includes: a second lens, configured to move from a third position to a fourth position under driving of a second drive circuit, where when the second lens is at the third position and the first lens is at the first position, the first light ray and the second light ray do not pass through the second lens, so that the visual distance of the virtual image of the first picture is equal to the visual distance of the virtual image of the second picture; and when the second lens is at the fourth position, the second light ray passes through the second lens, so that the visual distance of the virtual image of the first picture is not equal to the visual distance of the virtual image of the second picture.

With reference to the first aspect, in some possible embodiments, a focal length of the first lens is not equal to a focal length of the second lens. The visual distance of the virtual image of the first picture that is generated when the first lens is at the first position and the second lens is at the third position is greater than the visual distance of the virtual image of the first picture that is generated when the first lens is at the second position. The visual distance of the virtual image of the first picture that is generated when the first lens is at the first position and the second lens is at the third position is less than the visual distance of the virtual image of the second picture that is generated when the second lens is at the fourth position.

With reference to the first aspect, in some possible embodiments, the head-up display further includes: a reflector combination, where the reflector combination is located between the picture generation unit and a windshield; when the first light ray is reflected to the windshield through the reflector combination, the virtual image of the first picture is generated on a side that is of the windshield and that is away from the reflector combination; and when the second light ray is reflected to the windshield through the reflector combination, the virtual image of the second picture is generated on the side that is of the windshield and that is away from the reflector combination.

With reference to the first aspect, in some possible embodiments, the first lens is a convex lens. When the first lens is at the second position, an optical center of the first lens is located outside an optical path formed by the first light ray.

With reference to the first aspect, in some possible embodiments, the second lens is a convex lens. When the second lens is at the fourth position, an optical center of the second lens is located outside an optical path formed by the second light ray.

With reference to the first aspect, in some possible embodiments, the reflector combination includes a first reflector and a second reflector. Both the first light ray and the second light ray are reflected to the second reflector by the first reflector, and then reflected to the windshield by the second reflector. The first reflector includes a convex plane facing the picture generation unit. A surface that is of the first reflector and that is away from the picture generation unit includes a reflective coating. The second reflector includes a concave plane facing the first reflector. A surface that is of the second reflector and that is away from the first reflector includes a reflective coating.

With reference to the first aspect, in some possible embodiments, the head-up display further includes a third reflector. The third reflector is configured to reflect the first light ray to the reflector combination.

With reference to the first aspect, in some possible embodiments, the head-up display further includes a controller. The controller includes one or more processors and one or more memories. The one or more memories store computer instructions. The one or more processors invoke the computer instructions to: receive an input first user operation; and instruct the first lens to move from the first position to the second position or drive the first lens to move from the second position to the first position through the first drive circuit in response to the first user operation.

With reference to the first aspect, in some possible embodiments, the one or more processors are further configured to: receive an input second user operation; and instruct the second lens to move from the third position to the fourth position or drive the second lens to move from the fourth position to the third position through the second drive circuit in response to the second user operation.

According to a second aspect, an embodiment of this application provides a vehicle, including any head-up display according to the first aspect.

According to a third aspect, an embodiment of this application provides a head-up display method. The method is applied to a head-up display system. The head-up display system includes a picture generation unit, a reflector combination, a first lens, a first drive circuit, and a windshield. The reflector combination is located between the picture generation unit and the windshield. When a first light ray is reflected to the windshield through the reflector combination, a virtual image of a first picture is generated on a side that is of the windshield and that is away from the reflector combination. When a second light ray is reflected to the windshield through the reflector combination, a virtual image of a second picture is generated on the side that is of the windshield and that is away from the reflector combination.

The method includes: obtaining the first picture and the second picture; outputting the first light ray and the second light ray through the picture generation unit, where the first light ray is used to output and display the first picture, and the second light ray is used to output and display the second picture; receiving an input first user operation; and moving the first lens from a first position to a second position or moving the first lens from the second position to the first position through the first drive circuit in response to the first user operation.

When the first lens is at the first position, the first light ray and the second light ray do not pass through the first lens, so that a visual distance of the virtual image of the first picture is equal to a visual distance of the virtual image of the second picture. When the first lens is at the second position, the first light ray passes through the first lens, so that the visual distance of the virtual image of the first picture is not equal to the visual distance of the virtual image of the second picture.

With reference to the second aspect, in some possible embodiments, the head-up display system further includes a second lens and a second drive unit. The method further includes: receiving an input second user operation; and driving the second lens to move from a third position to a fourth position or driving the second lens to move from the fourth position to the third position through the second drive circuit in response to the second user operation.

When the second lens is at the third position and the first lens is at the first position, the second light ray does not pass through the first lens and the second lens, so that the visual distance of the virtual image of the first picture is equal to the visual distance of the virtual image of the second picture. When the second lens is at the fourth position, the second light ray passes through the second lens, so that the visual distance of the virtual image of the first picture is not equal to the visual distance of the virtual image of the second picture.

In this application, based on implementations according to the foregoing aspects, the implementations may be further combined to provide more implementations.

DESCRIPTION OF EMBODIMENTS

Terms used in the following embodiments of this application are merely intended to describe specific embodiments, but are not intended to limit embodiments of this application. The terms "one", "a", "an", "the", and "this" of singular forms used in this specification and the appended claims of embodiments of this application are also intended to include plural forms, unless otherwise specified in the context clearly. It should also be understood that the term "and/or" used in embodiments of this application means and includes any or all possible combinations of one or more listed items.

The following describes some related concepts in embodiments of this application.

1. Principle of Forming a Virtual Image

A virtual image is an optical phenomenon that can be viewed directly by an eye but cannot be received by a light screen.

Figure 1:
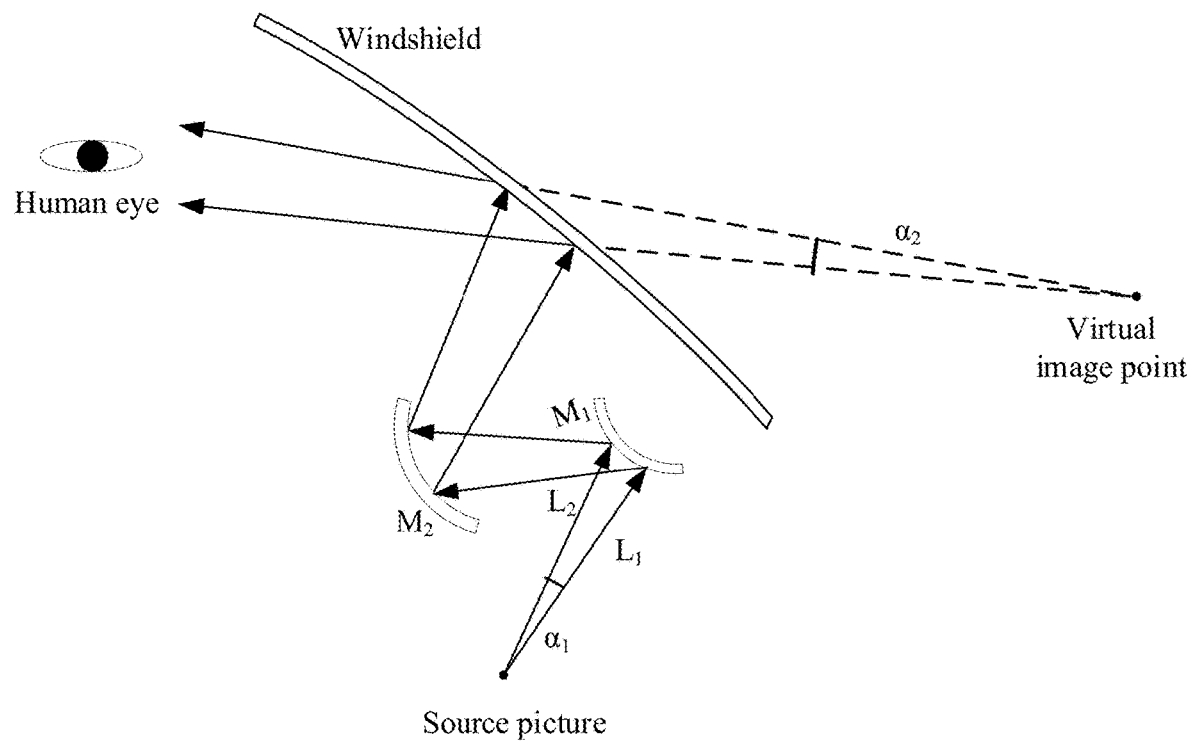
FIG. 1 is a schematic diagram of a principle of forming a virtual image according to an embodiment of this application.

In this embodiment, for an imaging principle of a head-up display, refer to FIG. 1. FIG. 1 is a schematic diagram of a principle of forming a virtual image according to an embodiment of this application. As shown in FIG. 1, a point of a source picture emits a light beam L with a specific divergence angle $\alpha_1$. The light beam L is denoted by $L_1$ and $L_2$. After being reflected by reflectors $M_1$ and $M_2$ and a windshield of an automobile, the light beam L enters a human eye at a divergence angle $\alpha_2$. A brain traces light rays backward based on experience of "rectilinear propagation of light", and considers a point at which the light beam L extended backward intersects as an object point, namely, a virtual image point.

2. Liquid-Crystal Display (LCD) Imaging Technology

LCD imaging uses a photoelectric effect of liquid crystals. An arrangement status of liquid crystal molecules changes due to impact of an external electric field. Liquid crystal molecules in different arrangement states can control a light transmittance. For example, there are liquid crystal molecules in the middle of two polarizers whose polarization directions are perpendicular to each other. When no electric field is applied, the liquid crystal molecules can rotate a polarization direction of linearly polarized light passing through the first polarizer by 90°. In this case, the light passes through the second polarizer at a maximum transmittance. When an electric field is applied, an arrangement status of the liquid crystal molecules changes, a rotation angle of polarized light also changes, and intensity of the light passing through the second polarizer decreases. Each pixel of an LCD includes three primary colors. A color picture is displayed by controlling strength of the three primary colors. The LCD technology is a passive imaging technology. The LCD imaging technology is a passive imaging technology. After a light ray from a light source passes through liquid crystals, brightness is attenuated to some extent. Light utilization is low, and it is difficult to display a high-brightness picture.

3. Digital Light Processing (DLP) Technology

DLP is a product developed by TI (Texas Instruments) in 1996. A core technology is a digital micromirror device (DMD) chip. Each DMD chip is integrated with hundreds of thousands of micromirror units. Each micromirror unit corresponds to one pixel. A drive circuit of DLP may independently control rotation of each micromirror unit. A rotation frequency may reach thousands of times per second. Different angles at which a micromirror unit rotates correspond to an on state and an off state. A micromirror unit in the on state reflects a light ray, and a corresponding pixel is in a bright state. A micromirror unit in the off state does not reflect light, and a corresponding pixel is in a dark state. The DMD chip is highly integrated. A gap between adjacent micromirror units is very small. There is no obvious pixel graininess. Therefore, a picture displayed by DLP is very delicate. Because DMD implements reflective imaging, light energy loss is very small. Therefore, light efficiency can reach more than 60%. This means that in comparison with other imaging technologies, a picture with higher brightness can be displayed through a same backlight source.

Currently, DLP imaging may be classified into single-chip, double-chip, and three-chip. Three-chip DLP is relatively complex, has relatively high production costs, and is usually used in high-end products. Double-chip DLP is seldom used. Single-chip DLP is most widely used. Each micromirror unit in a single-chip DLP imaging system corresponds to one pixel. A white light source is divided into three primary colors through an optical splitting system. The three primary colors are sequentially incident to micromirror units. A DLP control circuit drives the DMD to rotate quickly, and the three primary colors are selectively reflected quickly. A hysteresis effect of human eyes is used to synthesize a color required by each pixel. Finally, a picture is formed.

4. Reflector

A reflector is an optical element that works by using the law of reflection. Reflectors may be classified into planar reflectors, spherical reflectors, and aspheric reflectors by shape.

A mirror whose reflective surface is a part of a spherical surface is a spherical reflector. Further, the spherical reflectors may be classified into a concave mirror and a convex mirror. A spherical mirror that uses an inner side of the spherical surface as a reflective surface is a concave mirror. A spherical mirror that uses an outer side of the spherical surface as a reflective surface is a convex mirror. Reflection phenomena on the concave mirror and the convex mirror comply with the reflection law of light.

5. Free-Form Mirror

A surface of an optical element used in conventional optical design is a standard spherical surface. Usually, a plurality of spherical mirrors need to cooperate to correct an aberration. Consequently, an optical structure of the optical element is relatively complex, and relatively large space is occupied. As the optical industry develops, design and manufacturing technologies of relatively complex aspheric surfaces are greatly improved. Aspheric surfaces are usually quadratic surfaces such as a parabolic surface, an ellipsoidal surface, an involute surface, and a hyperbolic surface with a rotating axis, high-order surfaces, and non-rotating aspheric surfaces such as an off-axis aspheric surface. In different use scenarios, one aspheric surface may usually replace two or more spherical surfaces to correct an aberration, to simplify the optical structure and implement miniaturization and lightweight of an optical path.

Compared with the aspheric surface, a free-form surface is a more complex optical structure. A curvature radius of each point on the surface is different, and a degree of freedom of the surface is very high. The free-form surface can not only replace a plurality of aspheric surfaces to correct an aberration, but also maximally improve optical quality and simplify the optical structure. An optical free-form surface has a complex structure, a high degree of freedom, and no clear expression definition. Generally, an optical surface that does not have global rotational symmetry, does not have a unified optical axis, and has a plurality of curvature radii on the entire surface is considered as an optical free-form surface.

Optionally, a reflector in a reflector combination in this embodiment may be a spherical reflector or an aspheric reflector.

Preferably, the reflector in the reflector combination in this embodiment may alternatively be a free-form mirror. The free-form mirror may correct an aberration caused by an irregular surface of a windshield.

6. Convex Lens and Concave Lens

A convex lens and a concave lens are lenses made according to a refraction principle of light. The convex lens is a lens that is thick in a center and thin at an edge. The concave lens is a lens that is thin in a center and thick at an edge.

There is one focus on each of left and right sides of the convex lens. The two focuses are real focuses and are formed through convergence of actual light rays. An image formed by the convex lens may be an inverted and reduced real image, an inverted and same-size real image, an inverted and magnified real image, or an upright and magnified virtual image.

There is one focus on each of left and right sides of the concave lens. The two focuses are virtual focuses and are not formed through convergence of actual light rays. An image formed by the concave lens can only be an upright and reduced virtual image.

Figure 2:
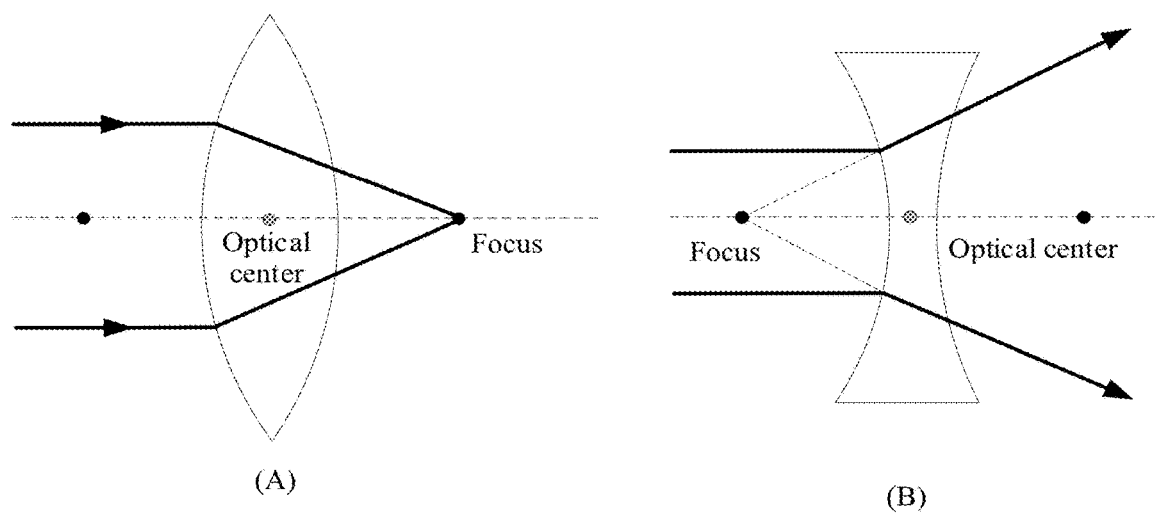
FIG. 2 is a schematic diagram of imaging of a convex lens and a concave lens according to an embodiment of this application.

Further, refer to FIG. 2. FIG. 2 is a schematic diagram of imaging of a convex lens and a concave lens according to an embodiment of this application. As shown in the figure, details are as follows:

A principal optical axis, also referred to as a principal axis, is a straight line that passes through sphere centers of two spherical surfaces of a thin lens, and is represented by a dashed line in the figure.

An optical center is a point in a center of a lens.

Further, (A) in FIG. 2 is a schematic diagram of imaging of a convex lens. As shown in the figure, the convex lens converges light rays. Light rays parallel to a principal optical axis are refracted by the convex lens and then pass through a focus. The light ray parallel to the principal optical axis deflects upward after being refracted by a lens part below an optical center of the convex lens. The light ray parallel to the principal optical axis deflects downward after being refracted by a lens part above the optical center of the convex lens.

Further, (B) in FIG. 2 is a schematic diagram of imaging of a concave lens. As shown in the figure, the concave lens diverges light rays. Light rays parallel to a principal optical axis are refracted by the concave lens and then diverge. Reverse extension lines of the diverged light rays intersect on the optical axis. As shown in the figure, the light ray parallel to the principal optical axis deflects downward after being refracted by a lens part below an optical center of the concave lens. The light ray parallel to the principal optical axis deflects upward after being refracted by a lens part above the optical center of the concave lens.

In this embodiment, a removable lens combination may include a convex lens and a concave lens. A propagation direction of a light ray of a target picture is changed through the convex lens and the concave lens, and a total focal length of an optical path is adjusted through focal lengths of the lenses, so that a visual distance of a virtual image of the target picture is changed.

7. Optical Design Method

In actual engineering application, during optical design, a structure parameter of an optical system usually needs to be determined based on a system application scenario while a specific imaging quality requirement is met. According to an optical aberration theory, an aberration of the optical system is directly related to the structure parameter of the system. Therefore, a function relationship of the system may be established, and then the structure parameter of the system is solved according to a requirement of imaging quality on the aberration.

However, for some complex optical systems, it is very complex to establish and solve functions. To reduce design difficulty of the complex system, a current method is to find an existing initial structure, and then perform optimization design on the structure through optical software, to finally obtain an optical structure that meets a requirement. For example, in Zemax, an optimization operand may be used to control a system structure variable. Further, during optimization, optimization iteration needs to be repeatedly performed on parameters such as a curvature, a cone surface coefficient, and a high-order term coefficient of each reflector, and a distance, a relative rotation angle, and an offset between reflectors. In addition, a constraint needs to be adjusted based on a result of each iteration to gradually meet a technical requirement of the system. It should be noted that a constraint angle change range of the reflector cannot be excessively large, and iteration optimization is performed at a small angle each time, to gradually approach an ideal angle.

This embodiment provides an initial optical structure of a head-up display. It may be understood that on this basis, the optical structure may be optimized and designed through optical software. For example, specific parameters such as a curvature and a focal length of a reflector in a reflector combination, and a distance parameter of each component in the head-up display are obtained. Therefore, in this embodiment, a distance between optical components of the head-up display and a focal length of each lens are not limited.

Figure 3:
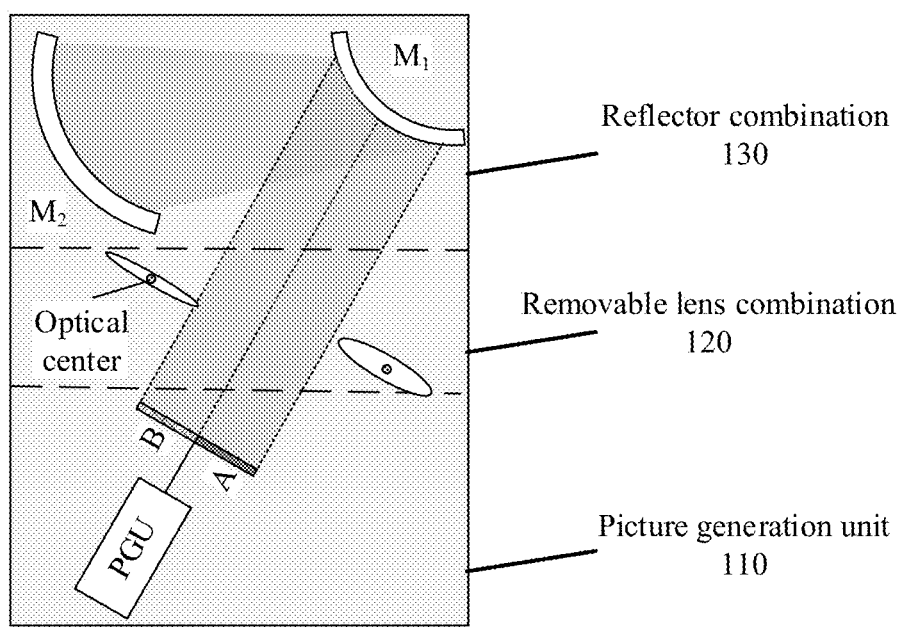
FIG. 3 is a schematic diagram of a structure of a head-up display according to an embodiment of this application.

FIG. 3 is a schematic diagram of a structure of a head-up display according to an embodiment of this application. The head-up display may include a picture generation unit (PGU) 110, a removable lens combination 120, and a reflector combination 130. The head-up display can implement switching between a single image plane and two image planes through the removable lens combination 120. Details are as follows:

The picture generation unit 110 is configured to emit a light ray of a target picture. Further, the picture generation unit 110 is configured to output a first light ray and a second light ray. The first light ray is used to output and display a first picture, and the second light ray is used to output and display a second picture. For example, the picture generation unit 110 may emit the light ray of the target picture to the reflector combination 130. In other words, the target picture is projected to the reflector combination 130. The target picture generated by the picture generation unit 110 may be one picture, or may include two pictures. This is not limited herein.

In some embodiments, different parts of the picture generation unit 110 generate different pictures. For example, the picture generation unit 110 may include a first light-emitting region and a second light-emitting region. The first light-emitting region is configured to emit the first light ray. The second light-emitting region is configured to emit the second light ray. Further, refer to the picture generation unit 110 shown in FIG. 3. As shown in the figure, a part A of the PGU may be configured to generate the first picture, and a part B of the PGU may be configured to generate the second picture. The first picture and the second picture may have different content. For example, the first picture may include status information and prompt information of a vehicle. The status information may be vehicle status information that a driver needs to grasp in real time in a process of driving the vehicle, for example, a vehicle speed and gear information. The status information may be displayed in real time in a normal state. The prompt information may be information displayed when a vehicle status or a function meets a trigger condition, for example, an excessively low fuel amount, an excessively high water temperature, an airbag fault, or a vehicle light turn-on prompt. The prompt information may be hidden under normal circumstances and displayed when the trigger condition is met. The second picture may include navigation information obtained after processing based on a real-time road environment outside the vehicle, for example, a navigation lane line, navigation path planning and indication, and auxiliary information (including a vehicle, a pedestrian, a rider, and the like).

In some embodiments, the picture generation unit 110 may alternatively output the first light ray and the second light ray sequentially.

Further, the picture generation unit 110 may be a cathode-ray tube (CRT), a picture generation unit based on an LCD technology, a picture generation unit based on a DLP technology, a picture generation unit based on a liquid crystal on silicon (LCoS) technology, or a module that is based on a laser beam scanning and display technology of a micro-electromechanical system (MEMS) or another technology and that can implement a picture projection function. This is not limited herein. For detailed content of the LCD technology and the DLP technology, refer to related content in the foregoing concept description.

In an implementation, to improve brightness of a picture so that the picture is bright enough to be unaffected by sunlight, the picture generation unit 110 may include a high-power light-emitting diode (LED) array, a lens array, and a liquid crystal panel. Further, the picture generation unit 110 uses the high-power LED array for illumination. The lens array is disposed in front of the LED array to shape a light beam, so that the light beam uniformly irradiates the liquid crystal panel. Finally, the liquid crystal panel projects the light beam to the removable lens combination 120. Because the high-power LED has a relatively high working temperature, a heat dissipation apparatus may be further disposed behind the LED, to ensure normal working of the system.

In another implementation, the picture generation unit 110 based on the DLP technology may include an illumination part, a picture generation part, and a transmissive projection screen. The illumination part emits a light beam that uniformly irradiates a DMD chip. After being modulated by the DMD chip, the light beam is reflected to a projection objective lens. The projection objective lens magnifies the light beam and projects the light beam to the transmissive projection screen to generate a picture. Finally, another unit of the head-up display reflects the picture to a human eye to form a virtual image.

In some other possible implementations, the DMD chip may alternatively be replaced by an LCoS chip. In addition, a red-green-blue (RGB) laser beam is used to generate pixels through MEMS scanning, to generate a picture. Then, another unit of the head-up display reflects the picture to a human eye to form a virtual image.

The reflector combination 130 is configured to magnify the target picture generated by the picture generation unit 110, and reflect the target picture to a windshield, so that a target virtual image is generated in front of the windshield. The reflector combination is located between the picture generation unit and the windshield. For example, the target picture includes the first picture and the second picture. When the first light ray is reflected to the windshield through the reflector combination, a virtual image of the first picture is generated on a side that is of the windshield and that is away from the reflector combination. When the second light ray is reflected to the windshield through the reflector combination, a virtual image of the second picture is generated on the side that is of the windshield and that is away from the reflector combination.

The reflector combination 130 includes at least one reflector. The reflector may be a convex reflector or a concave reflector. Preferably, the reflector may alternatively be a free-form mirror. Optionally, the reflector combination 130 may further include at least one lens. The lens may correct an aberration of the picture. The reflector in the reflector combination 130 may use a reflective coating to maximize reflectivity.

Preferably, the reflector combination may include two curved reflectors. A second reflector may be a concave mirror, and a first reflector may be a convex mirror or a concave mirror. Optionally, the reflector combination has only one curved reflector. In this case, the curved reflector is usually a concave mirror. The reflector combination may include one concave reflector and one or more lenses. It should be noted that one or more planar reflectors may exist in the reflector combination, and are configured to fold and steer an optical path.

In some embodiments, the reflector combination 130 may include two reflectors. Further, refer to the reflector combination 130 shown in FIG. 3. As shown in the figure, the reflector combination 130 includes the first reflector and the second reflector. The first reflector is denoted by $M_1$, and the second reflector is denoted by $M_2$. Further, both the first light ray and the second light ray may be reflected to the second reflector by the first reflector, and then reflected to the windshield by the second reflector. The first reflector includes a convex plane facing the picture generation unit. A surface that is of the first reflector and that is away from the picture generation unit includes a reflective coating. The second reflector includes a concave plane facing the first reflector. A surface that is of the second reflector and that is away from the first reflector includes a reflective coating.

The first reflector is configured to fold an optical path. The second reflector may have an arc surface and is configured to magnify the picture. Optionally, the first reflector may be further configured to magnify the picture, correct an aberration, and control a distance between the picture generation unit 110, the first reflector, and the second reflector. The second reflector may be further configured to correct the aberration. Preferably, the first reflector and the second reflector may be XY polynomial free-form mirrors. Coefficients of a polynomial are main variables in optical system optimization design, and are obtained through software optimization design. Details are not described herein.

Further, the picture generation unit 110 projects the picture to the first reflector. The picture is reflected to the second reflector by the first reflector, and then reflected to the windshield by the second reflector, so that the virtual image is generated in front of the windshield. The first reflector is configured to the picture. The first reflector may be a convex mirror. The second reflector is configured to magnify the picture reflected by the first reflector. The second reflector may be a concave mirror. Preferably, the second reflector may be a free-form mirror. The first reflector may be a concave mirror or a semi-reflective semi-transparent mirror. As shown in FIG. 3, the combination of the first reflector and the second reflector is configured to fold the optical path and increase a length of the optical path. It should be noted that if the virtual image needs to have a sufficiently large display size when a projection technology is the same, an optical path of the virtual image in the head-up display needs to be prolonged. It can be learned that the combination of the first reflector and the second reflector can implement two reflections, to resolve a problem that a structure control occupies relatively large space when there is one reflection.

The removable lens combination 120 is configured to change a propagation direction of light of an initial optical system, and change a visual distance of a virtual image of a target picture of the initial optical system. The visual distance of the virtual image is a distance between an observer and a plane on which the virtual image is located. For example, the visual distance of the virtual image may be a distance between a visually generated picture and a human eye. The initial optical system is an optical system constituted by the picture generation unit 110, the reflector combination 130, and the windshield.

The removable lens combination 120 includes at least one concave lens or one convex lens. For example, the removable lens combination includes a first lens. The first lens is configured to move from a first position to a second position under driving of a first drive circuit. When the first lens is at the first position, the first light ray and the second light ray do not pass through the first lens, and a visual distance of the virtual image of the first picture is equal to a visual distance of the virtual image of the second picture. When the first lens is at the second position, the first light ray passes through the first lens, and the visual distance of the virtual image of the first picture is not equal to the visual distance of the virtual image of the second picture. The visual distance of the virtual image is a distance between the observer and the plane on which the virtual image is located.

Further, when the removable lens combination 120 is inserted into a target position, a visual distance of a virtual image of the target picture changes. The target position is located between the picture generation unit 110 and the reflector combination 130 or between two optical elements in the reflector combination 130. The picture generation unit 110, the removable lens combination 120, the reflector combination 130, and the windshield may constitute an optical system of the head-up display. Further, after the target picture generated by the picture generation unit 110 passes through the removable lens combination 120 and the reflector combination 130, the target picture is reflected to the windshield, to generate the target virtual image.

In some embodiments, the target picture includes the first picture and the second picture. A virtual image generated by projecting the first picture is a first virtual image. A virtual image generated by projecting the second picture is a second virtual image. An optical path used by the optical system to project the first picture as the first virtual image is a first optical path. An optical path used by the optical system to project the second picture as the second virtual image is a second optical path.

When the removable lens combination is not inserted into the target position, the optical system in the head-up display is in a state of the initial optical system. In this case, because the first optical path and the second optical path are the same optical path, the visual distance of the virtual image of the first picture is the same as that of the second picture after both the pictures pass through the same optical path. The first virtual image and the second virtual image are formed on one image plane.

Figure 4A:
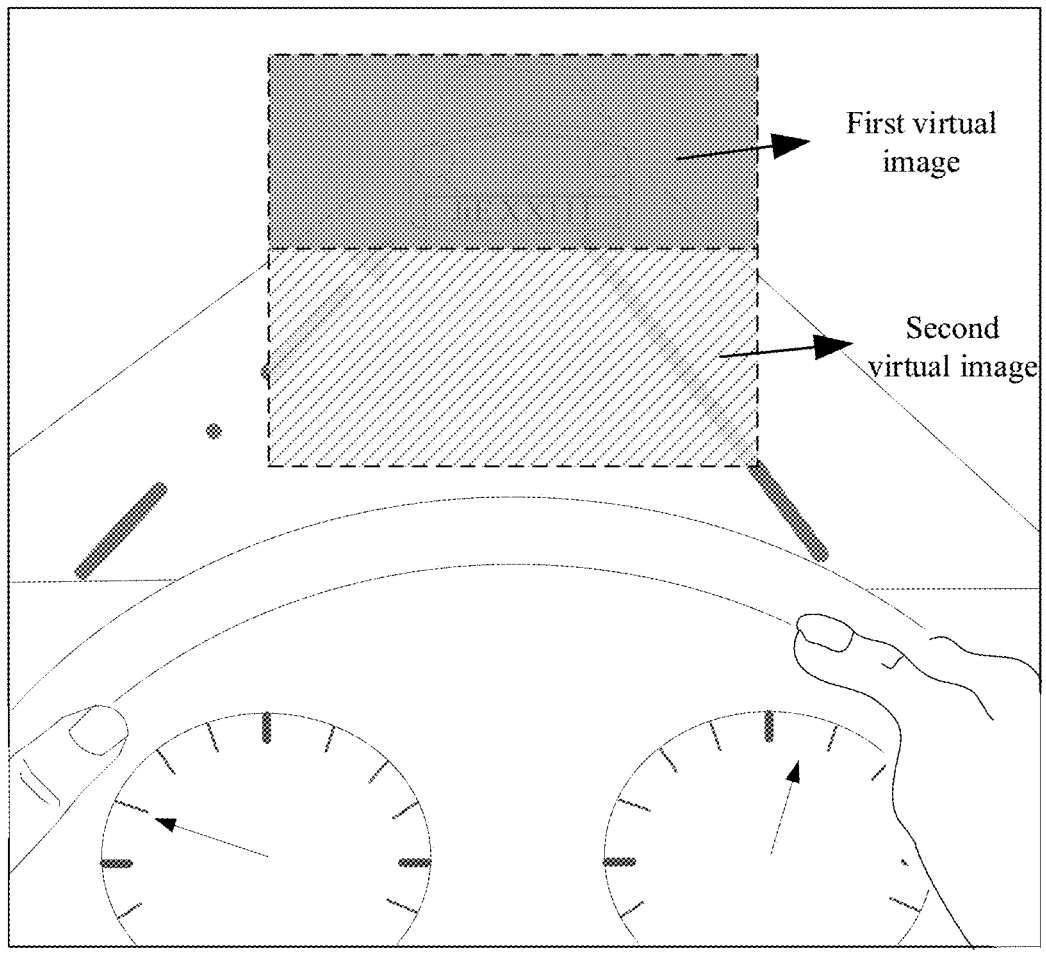
FIG. 4A is a schematic diagram of an imaging effect of a head-up display according to an embodiment of this application.

In some embodiments, the first virtual image and the second virtual image may be spliced by adjusting an optical element of the head-up display. Edges of the first virtual image and the second virtual image are connected, to form a complete image on one image plane. FIG. 4A is a schematic diagram of an imaging effect of a head-up display according to an embodiment of this application. As shown in FIG. 4A, the first virtual image is an upper part of an image, and a second virtual image is a lower part of the image. In this case, the first picture and the second picture may be considered as one target picture, and the first virtual image and the second virtual image may be considered as one target virtual image. The target virtual image displays content of the target picture.

When the removable lens combination is inserted into the target position, the removable lens combination is configured to separate the first virtual image from the second virtual image. That is, the first virtual image and the second virtual image are located on different image planes. The first virtual image and the second virtual image do not overlap.

Further, the removable lens combination is configured to change the visual distance of the virtual image of the first picture or the second picture; or is configured to change the visual distances of the virtual images of both the first picture and the second picture. In addition, the removable lens combination may be further configured to change a propagation direction of the first picture or the second picture, so that the first picture and the second picture do not overlap; or configured to change propagation directions of both the first picture and the second picture, so that the first picture and the second picture do not overlap.

Figure 4B:
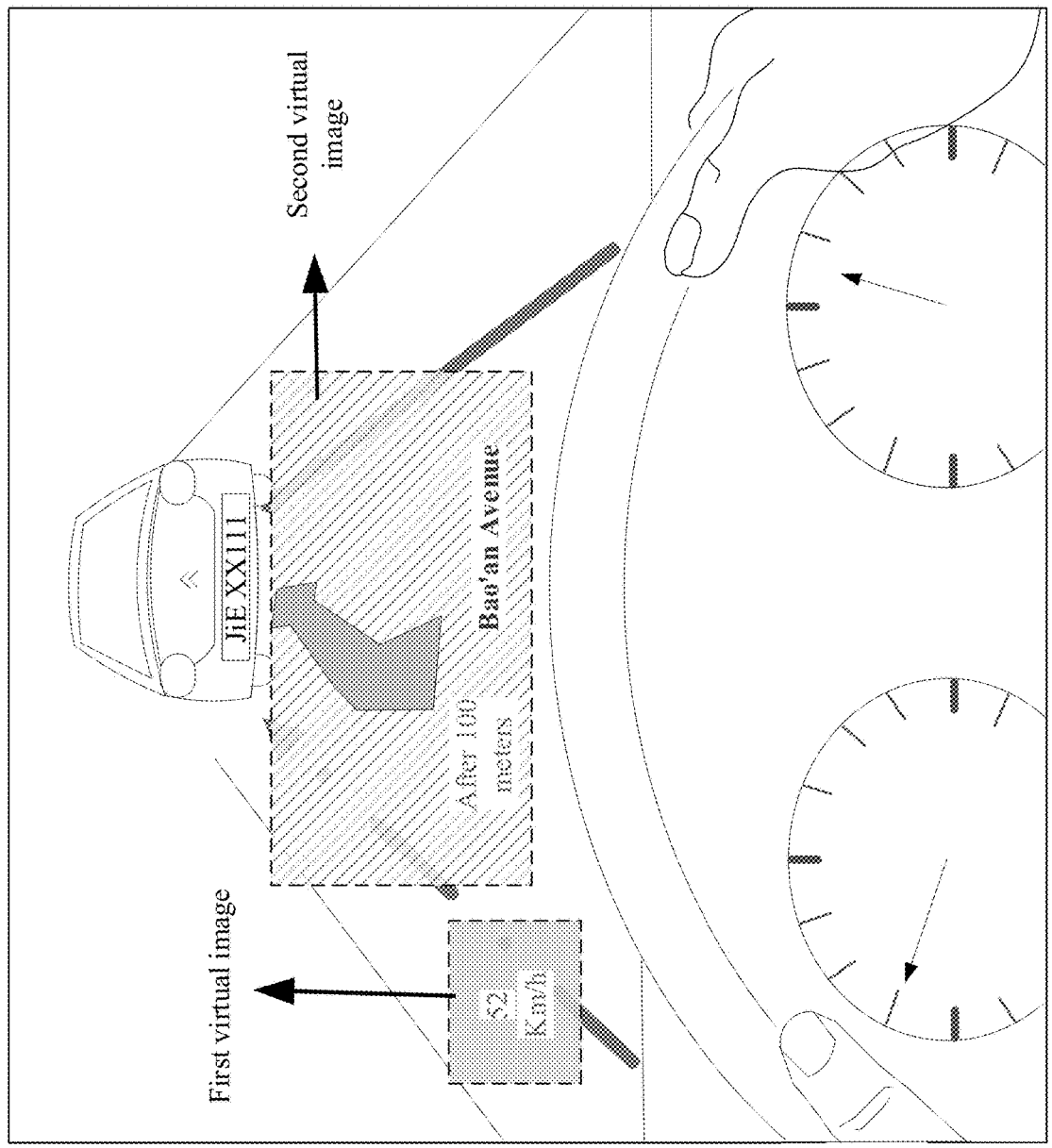
FIG. 4B is a schematic diagram of another imaging effect of a head-up display according to an embodiment of this application.

When the removable lens combination is inserted into the target position, a final imaging result of the head-up display may be that the first picture and the second picture are imaged on two image planes, so that the first virtual image and the second virtual image are respectively displayed on the two image planes. FIG. 4B is a schematic diagram of another imaging effect of a head-up display according to an embodiment of this application. As shown in FIG. 4B, the head-up display projects the first picture on a near projection plane in front of the windshield, to generate the first virtual image; and projects the second picture on a far projection plane in front of the windshield, to generate the second virtual image that fits a road surface. Further, the first virtual image displays content of the first picture. The first picture may be the status information of the vehicle, and displays a current vehicle speed of 52 kilometers per hour (km/h). The second virtual image displays content of the second picture. The second picture may be the navigation information, and displays turning right after 100 meters to enter Bao'an Avenue.

Figure 5:
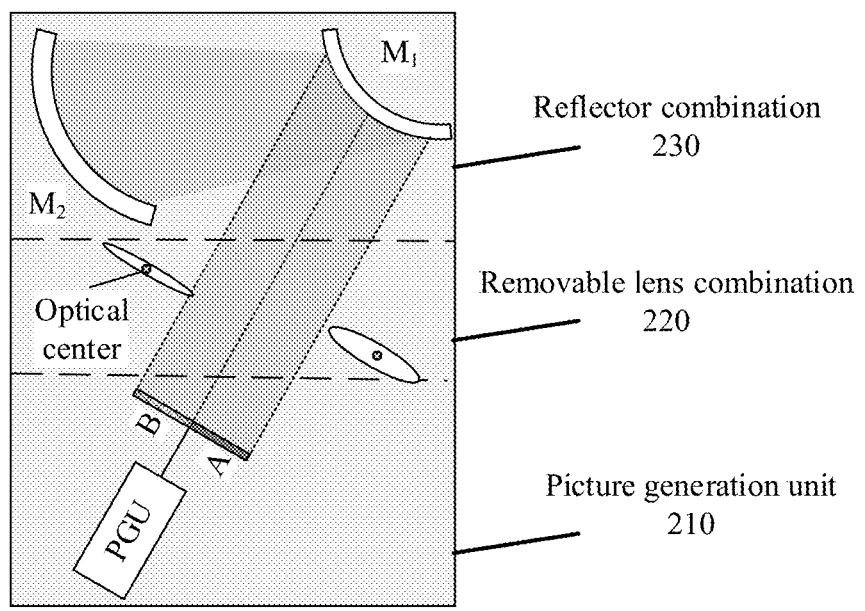
FIG. 5 is a schematic diagram of a structure of another head-up display according to an embodiment of this application.

FIG. 5 is a schematic diagram of a structure of another head-up display according to an embodiment of this application. The head-up display includes a picture generation unit 210, a removable lens combination 220, and a reflector combination 230. The head-up display can implement switching between a single image plane and two image planes by controlling the removable lens combination 220. Details are as follows:

For the picture generation unit 210 and the reflector combination 230 of the head-up display, refer to related content of the picture generation unit 110 and the reflector combination 130. Details are not described herein again.

The removable lens combination 220 of the head-up display may include two lenses. For example, the removable lens combination 220 may include a first lens and a second lens. The first lens is configured to change a visual distance of a virtual image of a first picture and a propagation direction of a first light ray. The second lens is configured to change a visual distance of a virtual image of a second picture and a propagation direction of a second light ray.

The second lens is configured to move from a third position to a fourth position under driving of a second drive circuit. When the second lens is at the third position and the first lens is at the first position, the first light ray and the second light ray do not pass through the second lens, so that the visual distance of the virtual image of the first picture is equal to the visual distance of the virtual image of the second picture. When the second lens is at the fourth position, the second light ray passes through the second lens, so that the visual distance of the virtual image of the first picture is not equal to the visual distance of the virtual image of the second picture.

Further, when the first lens is inserted into a first optical path, a propagation direction of the first optical path in an initial optical system changes. In other words, the propagation direction of the first light ray changes. When the second lens is inserted into a second optical path, a propagation direction of the second optical path in the initial optical system changes. In other words, the propagation direction of the second light ray changes.

In some embodiments, as shown in FIG. 5, both the first lens and the second lens are convex lenses. The first convex lens and the second convex lens have different focal lengths, so that the visual distance of the virtual image of the first picture is different from that of the second picture.

Before the first convex lens and the second convex lens are inserted into the initial optical system, that is, when an optical center of the first convex lens is located outside an optical path formed by a first light-emitting region and the reflector combination, and an optical center of the second convex lens is located outside an optical path formed by a second light-emitting region and the reflector combination, the first optical path and the second optical path in the initial optical system are the same. Imaging results of the first optical path and the second optical path are that visual distances of a first virtual image and a second virtual image are the same. In other words, the first virtual image and the second virtual image are formed on one image plane.

Figure 6A:
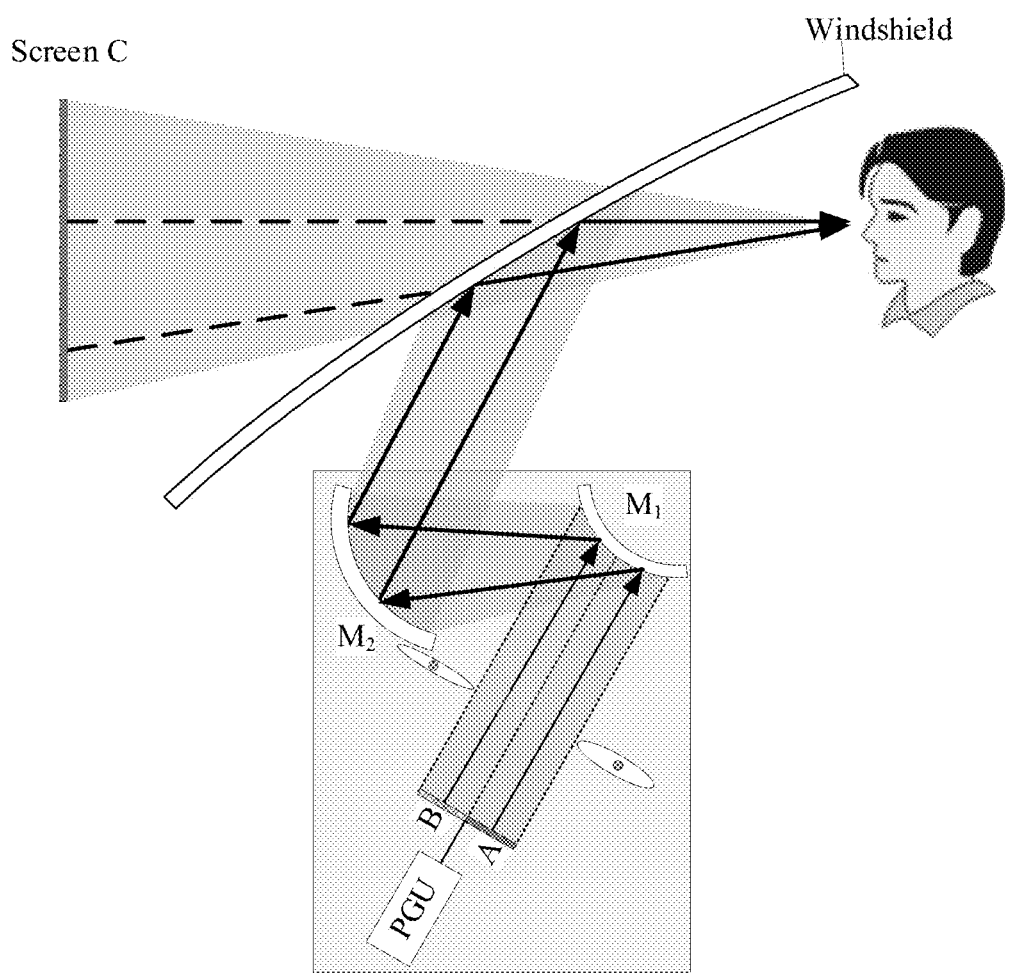
FIG. 6A is a schematic diagram of an optical path of a head-up display according to an embodiment of this application.

Further, FIG. 6A is a schematic diagram of an optical path of a head-up display according to an embodiment of this application. A part A of the PGU is configured to generate the first picture. A part B of the PGU is configured to generate the second picture. Arrows in the figure indicate propagation directions of the pictures. As shown in FIG. 6A, the first picture and the second picture are finally imaged on one image plane. The image plane is a screen C.

Figure 6B:
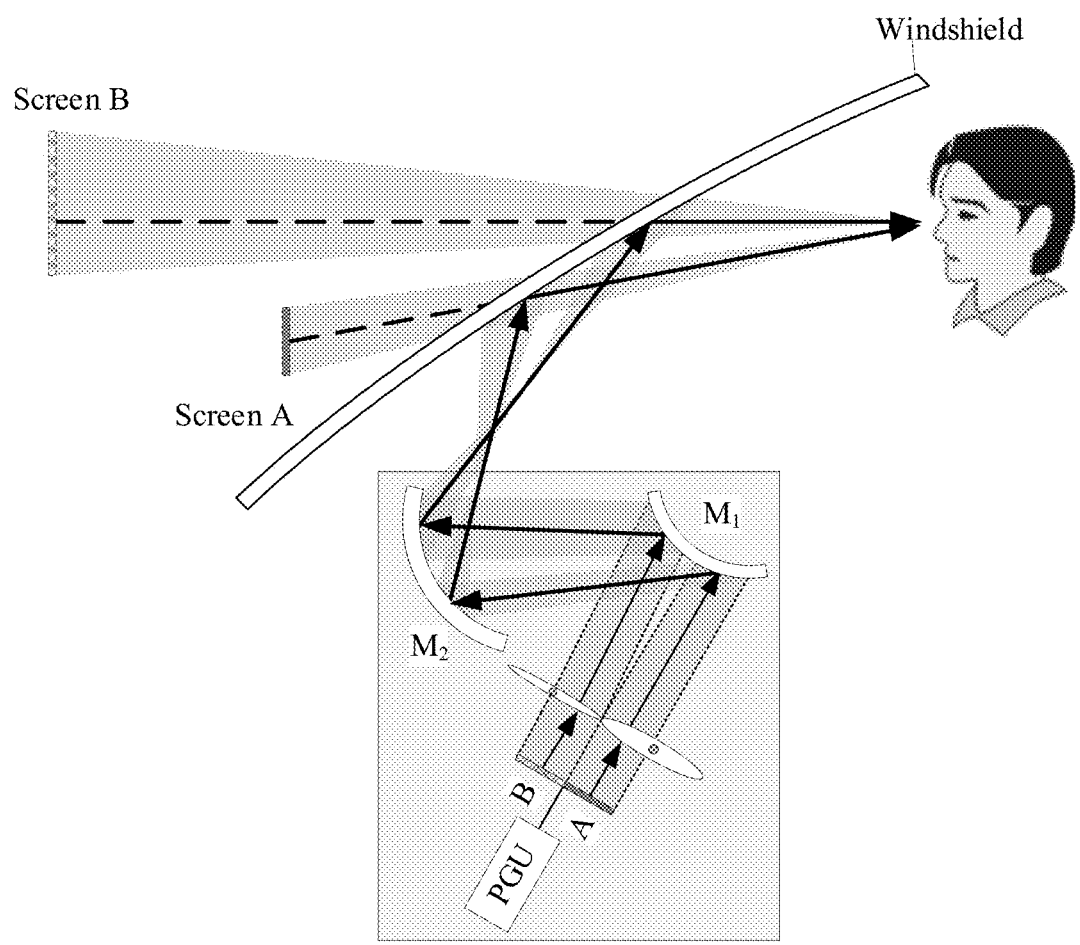
FIG. 6B is a schematic diagram of another optical path of a head-up display according to an embodiment of this application.

Different parts of the first convex lens and the second convex lens are inserted into the first optical path and the second optical path, and are configured to change the propagation directions of the first picture and the second light ray, so that the first picture and the second light ray do not overlap. FIG. 6B is a schematic diagram of another optical path of a head-up display according to an embodiment of this application. Further, as shown in FIG. 6B, when the first convex lens is inserted into a first position, the first light ray deflects upward through a lens part below the optical center of the first convex lens. In this case, the first picture is transmitted to the reflector combination through the lens part below the optical center of the first convex lens, so that the first optical path is offset upward and the visual distance of the virtual image of the first picture is reduced. An image plane on which the first virtual image is located is a screen A. When the second convex lens is inserted into a second position, the second light ray deflects downward through a lens part above the optical center of the second convex lens. In this case, the second picture passes through the lens part above the optical center of the second convex lens to the reflector combination, so that the second optical path is offset upward and the visual distance of the virtual image of the second picture is increased. An image plane on which the second virtual image is located is a screen B. The lens may be inserted into the optical path in a direction perpendicular to the optical path, or may be inserted into the optical path at a specific angle. This may be determined based on an angle at which the optical path needs to be offset, and is not limited herein.

In some embodiments, the first picture is dashboard information of a vehicle, and the second picture is navigation line information of the vehicle. In this case, the first virtual image is usually at a position shown in FIG. 4B, and has a relatively small size. The image plane (for example, the screen A in FIG. 6B) on which the first virtual image is located is close to a driver. The second virtual image is usually displayed at a position shown in FIG. 4B, and fits a road surface. The image plane (for example, the screen B in FIG. 6B) on which the second virtual image is located is away from the driver. Through the removable lens combination shown in FIG. 5, the first virtual image located on the screen A may be switched to the screen C shown in FIG. 6A for display, and the second virtual image located on the screen B may be switched to the screen C for display. Then, content of the first picture and the second picture may be replaced through the picture generation unit. In this way, a target virtual image formed by splicing the first virtual image and the second virtual image can be displayed on the screen C. It may be understood that a quantity of pixels of the target virtual image is greater than a quantity of pixels of the first virtual image and a quantity of pixels of the second virtual image. In other words, a resolution of the target virtual image is greater than that of the first virtual image and that of the second virtual image. In addition, a size of the target virtual image is greater than that of the first virtual image. This can meet an entertainment requirement of a user, such as watching a video or displaying a photo.

Figure 7:
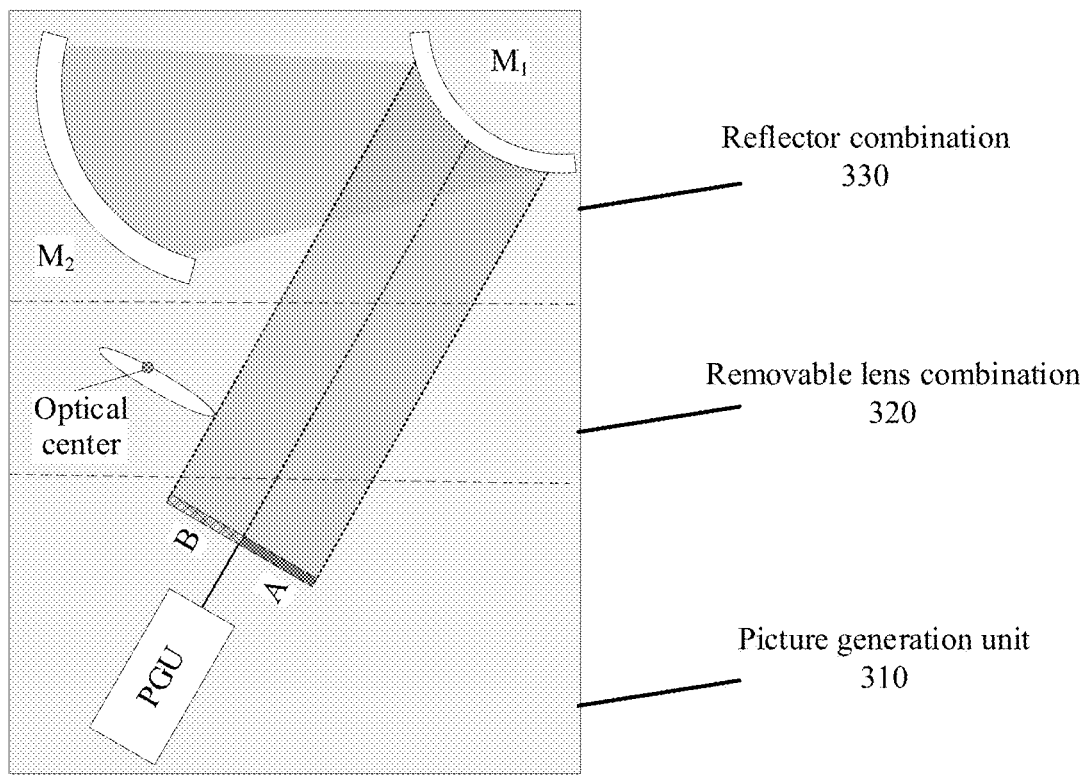
FIG. 7 is a schematic diagram of a structure of still another head-up display according to an embodiment of this application.

FIG. 7 is a schematic diagram of a structure of still another head-up display according to an embodiment of this application. The head-up display includes a picture generation unit 310, a removable lens combination 320 and a reflector combination 330. The head-up display can implement switching between a single image plane and two image planes by controlling the removable lens combination 320. Details are as follows:

For the picture generation unit 310 and the reflector combination 330 of the head-up display, refer to related content of the picture generation unit 110 and the reflector combination 130. Details are not described herein again.

The removable lens combination 320 of the head-up display may include one lens. The lens is configured to change a visual distance of a virtual image of a first picture and a propagation direction of a first light ray, or is configured to change a visual distance of a virtual image of a second picture and a propagation direction of a second light ray.

Further, the lens may be the first convex lens in FIG. 5 or the second convex lens in FIG. 5. For content of inserting the lens into an optical path, refer to the foregoing related content.

Figure 8A:
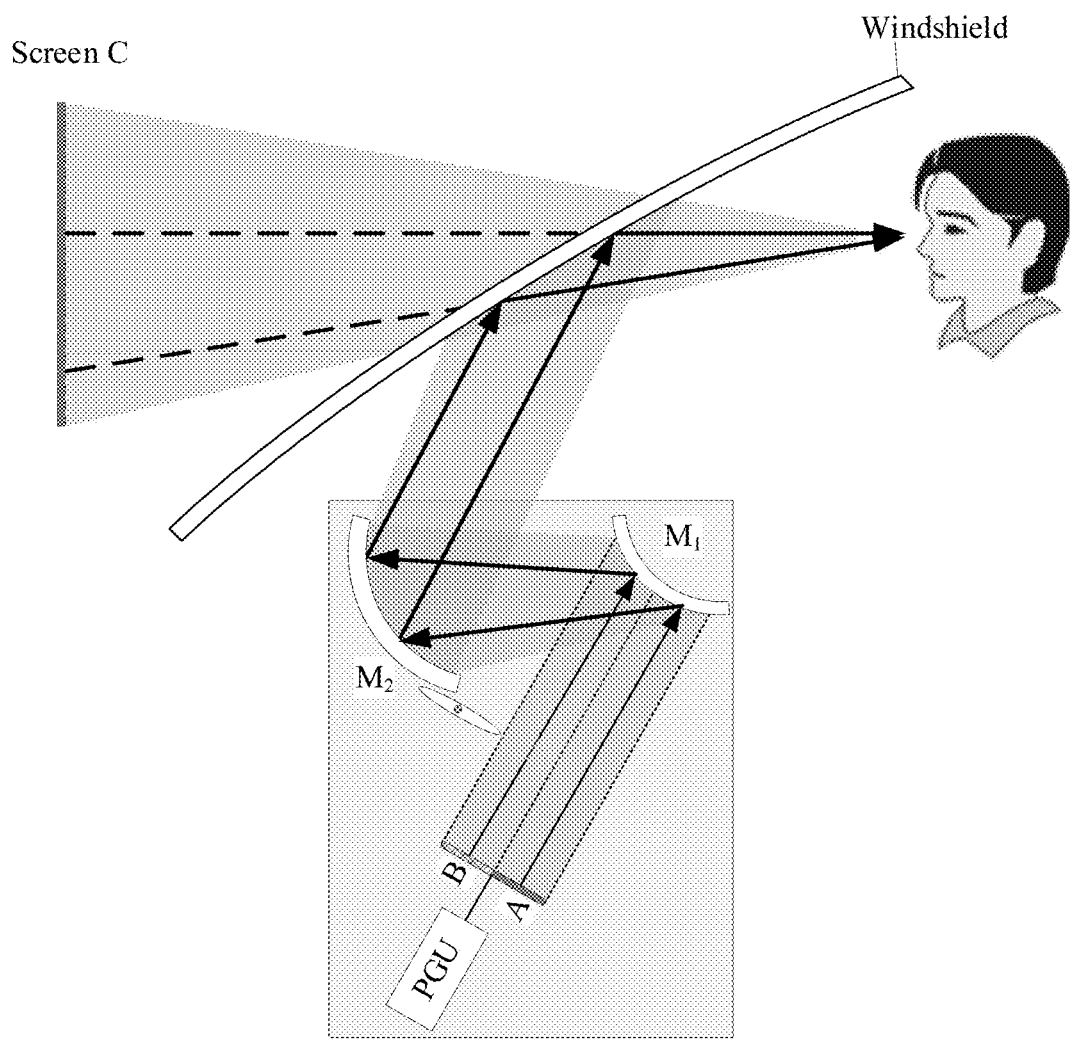
FIG. 8A is a schematic diagram of still another optical path of a head-up display according to an embodiment of this application.
Figure 8B:
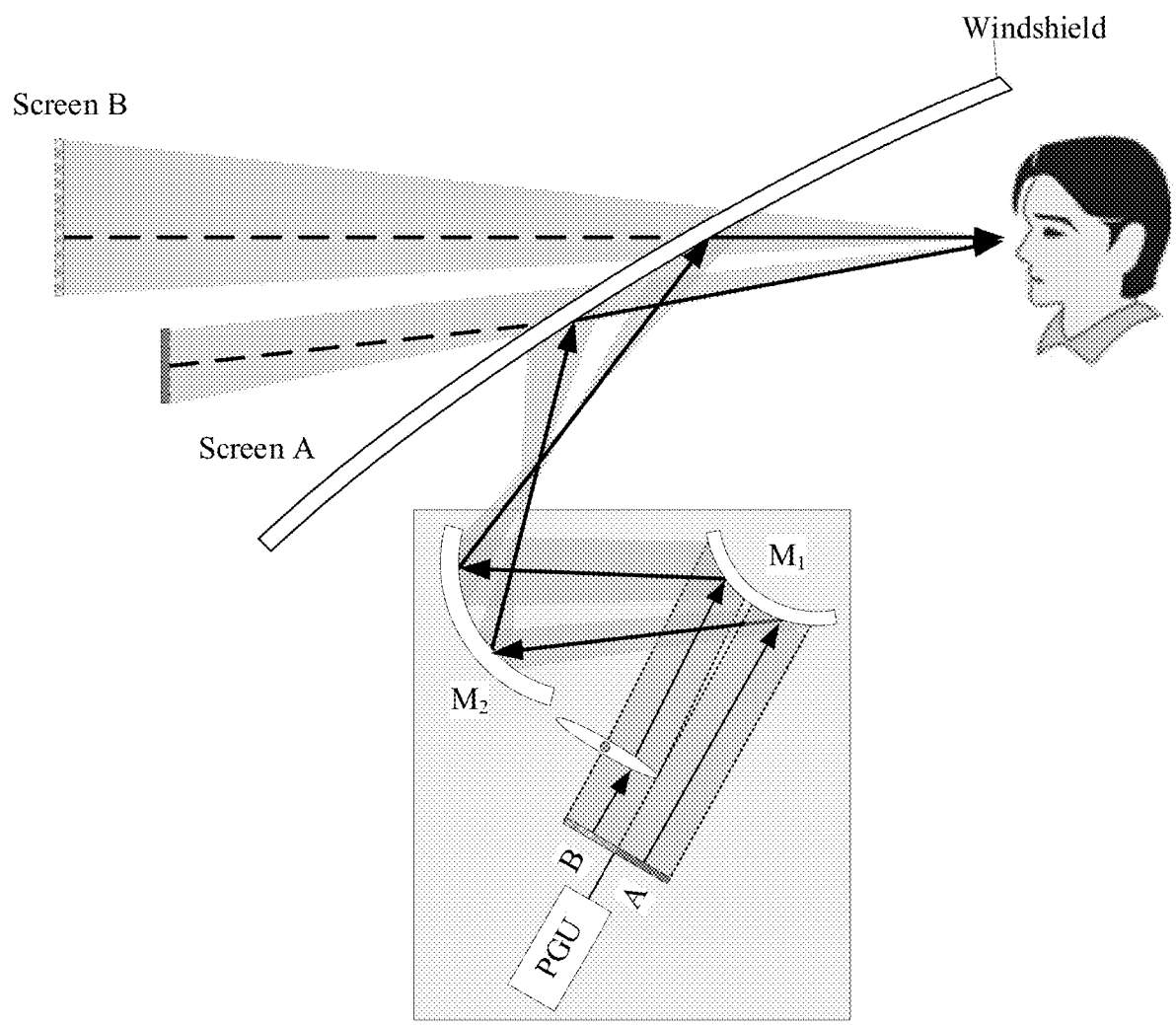
FIG. 8B is a schematic diagram of yet another optical path of a head-up display according to an embodiment of this application.

When the lens is the first convex lens, refer to FIG. 8A and FIG. 8B. FIG. 8A is a schematic diagram of still another optical path of a head-up display according to an embodiment of this application. Before the first convex lens is inserted into an initial optical system, the first picture and the second picture are imaged on one image plane. For details, refer to descriptions of related content in FIG. 6A. FIG. 8B is a schematic diagram of yet another optical path of a head-up display according to an embodiment of this application. When the first convex lens is inserted into a first position, the first light ray deflects upward through a lens part below an optical center of the first convex lens. In this case, the first picture is transmitted to the reflector combination through the lens part below the optical center of the first convex lens, so that the first optical path is offset upward and the visual distance of the virtual image of the first picture is reduced. For details, refer to related content corresponding to FIG. 6B. Compared with the head-up display shown in FIG. 5, the head-up display reduces a quantity of lenses, and changes an image plane of only one of the two pictures.

Figure 9:
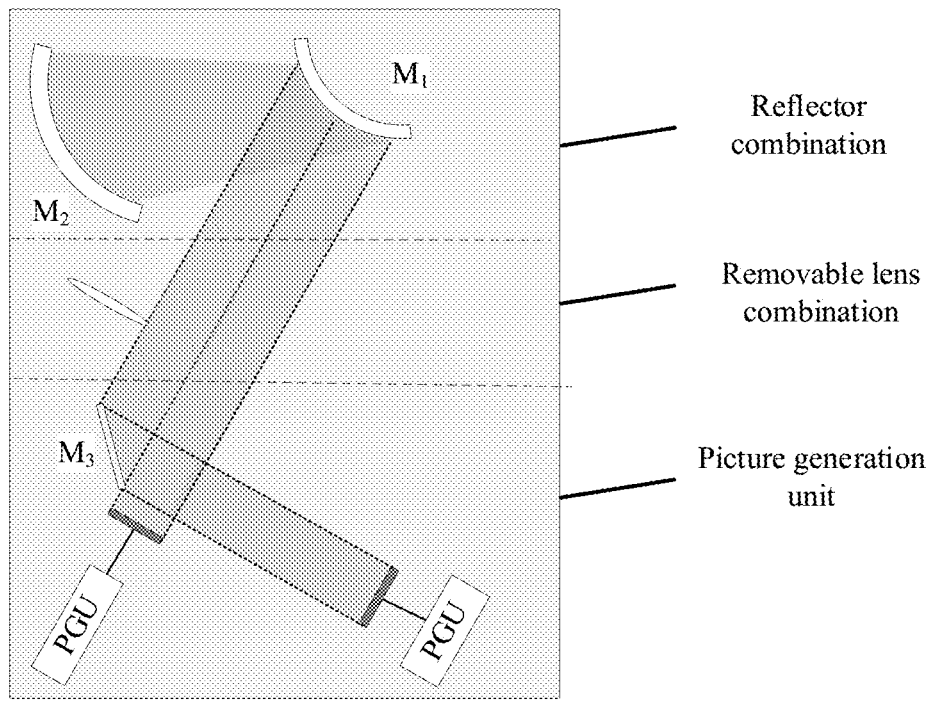
FIG. 9 is a schematic diagram of a structure of a picture generation unit according to an embodiment of this application.

FIG. 9 is a schematic diagram of a structure of a picture generation unit according to an embodiment of this application.

In some embodiments, when a first picture and a second picture generated by a single picture generation unit cannot meet a requirement of a user, for example, when the user requires a specified resolution, a head-up display may include two picture generation units. It may be understood that pixels of a picture generated by a single picture generation unit are limited. Because more pixels of a picture indicate a higher resolution of the picture, when the pixels of the picture generated by the single picture generation unit cannot meet a resolution requirement of the picture, one picture generation unit may be added to improve a resolution of the picture.

When positions of the picture generation units are shown in FIG. 9, the head-up display may further include a third reflector. The third reflector is configured to reflect, to a reflector combination, a light ray emitted by a first light-emitting region.

To better understand a head-up display method, a head-up display, and a computer-readable storage medium provided in embodiments of this application, the following first describes a system architecture used in embodiments of this application.

Figure 10:
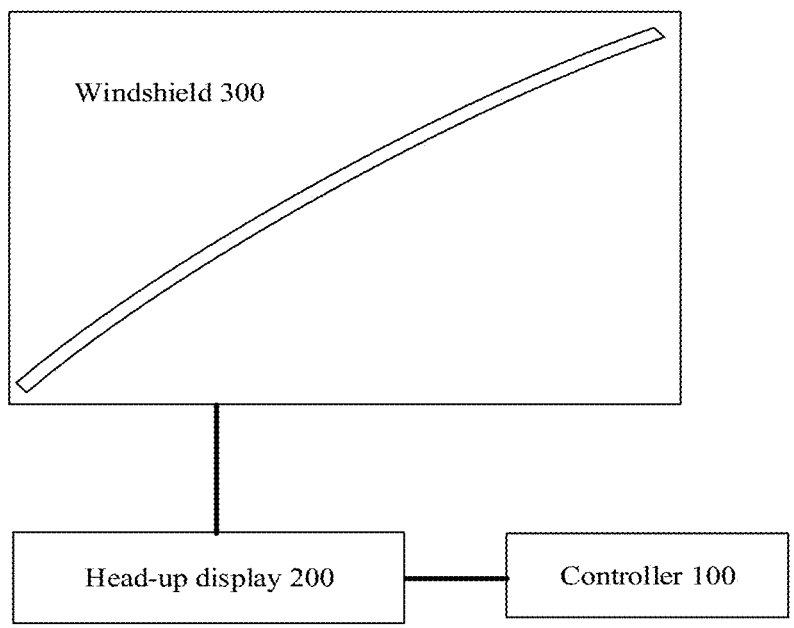
FIG. 10 is a schematic diagram of a structure of a head-up display system according to an embodiment of this application.

FIG. 10 is a schematic diagram of a structure of a head-up display system according to an embodiment of this application. The system architecture may include a controller 100, a head-up display 200, and a windshield 300. The head-up display 200 may include a picture generation unit, a removable lens combination, and a reflector combination. Further, the controller 100 is configured to receive a user instruction, generate a picture based on the user instruction, and send the picture to the head-up display 200. The head-up display 200 is configured to magnify the picture sent by the controller 100, and reflect the magnified image to the windshield 300, so that a virtual image is generated in front of the windshield 300.

Further, the controller 100 may receive the user instruction, generate the picture based on the user instruction, and send the picture to the head-up display 200, that is, send the picture to the picture generation unit in the head-up display 200. In the head-up display, the picture generation unit projects the picture to the reflector combination. Then, the reflector combination reflects the picture to the windshield 300. When the removable lens combination is inserted into a target position, a visual distance of a virtual image of the target picture changes. The target position is located between the picture generation unit and the reflector combination or between two optical elements in the reflector combination.

For example, the controller 100 may be an electronic information system. The electronic information system may collect vehicle data such as scenario data, and then generate a picture based on the vehicle data. For example, the electronic information system may collect dashboard information such as a speed of a vehicle, and generate a dashboard picture based on the data. For another example, the electronic information system may collect, through a camera, scenario data in a process of driving the vehicle, and then generate a vehicle navigation line picture based on the scenario data.

The controller 100 may further control each component in the head-up display 200 based on the user instruction. Further, the controller 100 may send different pictures to the picture generation unit in the head-up display 200 to control content of the picture projected by the picture generation unit, to change displayed content of the virtual image. The controller may further control a position of the removable lens combination in the head-up display 200, to control the picture to be imaged on one or more image planes. For example, the head-up display shown in FIG. 5 is used as an example. The user instruction received by the controller 100 is used to instruct the head-up display system to perform imaging on a single image plane. In this case, the controller 100 may generate one picture based on the instruction, and then remove a lens in the removable lens combination from an optical path of the head-up display 200. For another example, the instruction is used to instruct the head-up display system to perform imaging on two image planes. In this case, the controller 100 may generate two pictures based on the instruction, and then insert the lens in the removable lens combination into the optical path of the head-up display 200.

It should be noted that the head-up display is not limited to the foregoing components. For example, the head-up display system may further include a binocular camera. The binocular camera is configured to obtain scenario data.

It may be understood that the system architecture of the head-up display system in FIG. 10 is merely an example implementation of embodiments of this application. The system architecture of the head-up display system in embodiments of this application includes but is not limited to the foregoing system architecture.

For example, in a possible head-up display system, the head-up display 200 may include the controller 100. The controller includes one or more processors, one or more memories, and a first drive element. The one or more memories store computer instructions. The one or more processors invoke the computer instructions to receive an input first user operation; and drive, through the first drive element in response to the first user operation, a first lens to be inserted between a first light-emitting region and the reflector combination or to be removed from between the first light-emitting region and the reflector combination. For another example, the head-up display further includes a second drive element. The one or more processors are further configured to receive an input second user operation; and drive, through the second drive element in response to the second user operation, a second lens to be inserted between the first light-emitting region and the reflector combination or to be removed from between the second light-emitting region and the reflector combination.

Figure 11:
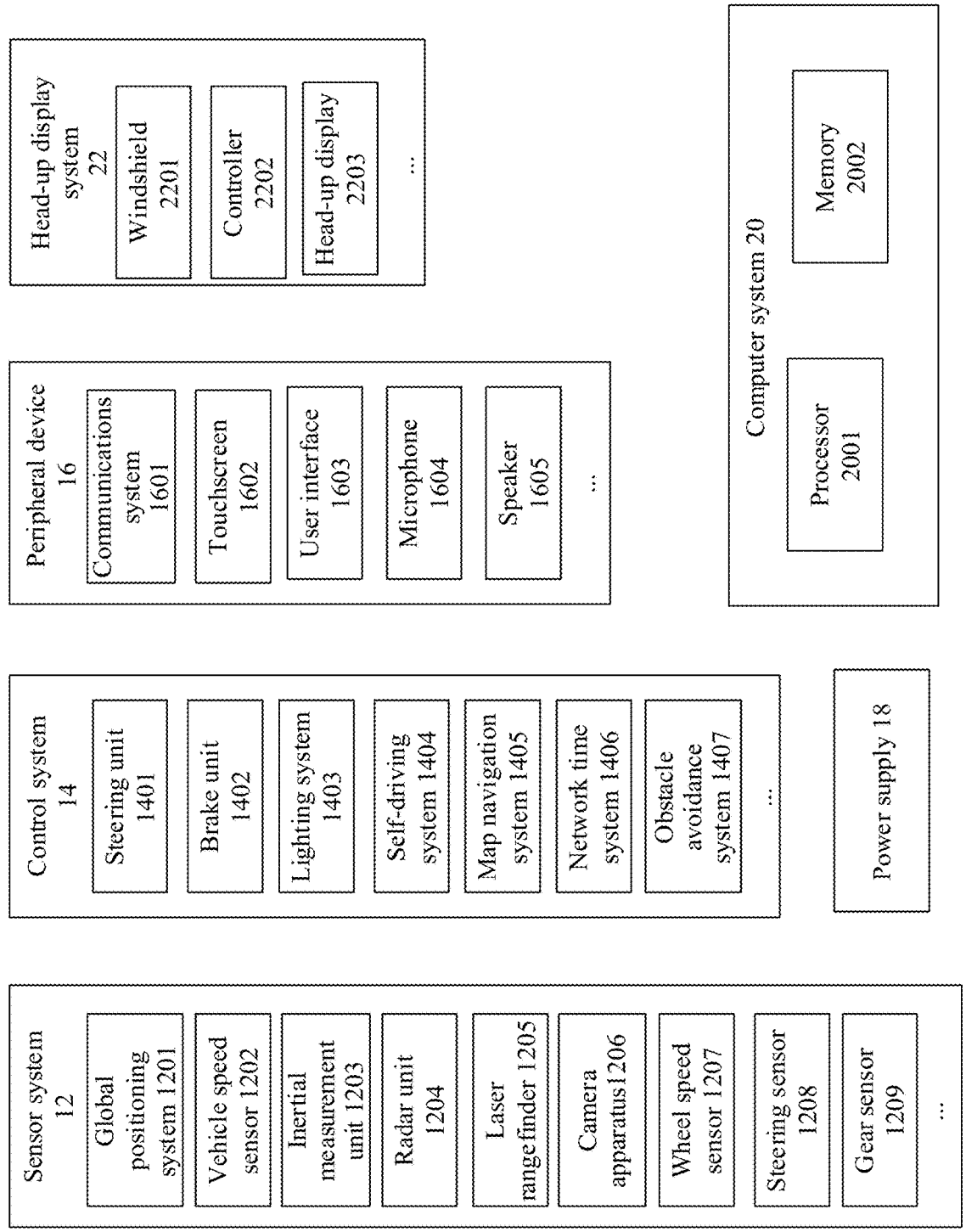
FIG. 11 is a schematic diagram of a possible functional framework of a vehicle 10 according to an embodiment of this application.

The head-up display system may be installed on a vehicle. FIG. 11 is a schematic diagram of a possible functional framework of a vehicle 10 according to an embodiment of this application. As shown in FIG. 11, the functional framework of the vehicle 10 may include various subsystems, for example, a sensor system 12, a control system 14, one or more peripheral devices 16 (one peripheral device is used as an example in the figure), a power supply 18, a computer system 20, and a head-up display system 22. Optionally, the vehicle 10 may further include another functional system, for example, an engine system that provides power for the vehicle 10. This is not limited in this application. Details are as follows:

The sensor system 12 may include a plurality of detection apparatuses. The detection apparatuses can sense measured information, and convert the sensed information into an electrical signal or other information in a required form based on a specific rule for output. As shown in the figure, the detection apparatuses may include a Global Positioning System (GPS) 1201, a vehicle speed sensor 1202, an inertial measurement unit (IMU) 1203, a radar unit 1204, a laser rangefinder 1205, a camera apparatus 1206, a wheel speed sensor 1207, a steering sensor 1208, a gear sensor 1209, or other elements used for automatic detection. This is not limited in this application.

The GPS 1201 is a system that implements positioning and navigation worldwide in real time through a GPS positioning satellite. In this application, the global positioning system GPS may be configured to position the vehicle in real time, and provide geographical location information of the vehicle. The vehicle speed sensor 1202 is configured to detect a driving speed of the vehicle. The inertial measurement unit 1203 may include a combination of an accelerometer and a gyroscope, and is an apparatus that measures an angular velocity and an acceleration of the vehicle 10. For example, during driving of the vehicle, the inertial measurement unit may measure a location, an angular variation, and the like of a vehicle body based on an inertial acceleration of the vehicle.

The radar unit 1204 may also be referred to as a radar system. The radar unit senses an object by using a radio signal in a current environment of vehicle driving. Optionally, the radar unit may further sense information such as a running speed and a direction of travel of the object. In actual application, the radar unit may be configured as one or more antennas for receiving or sending a radio signal. The laser rangefinder 1205 may be an instrument that measures a distance to a target object through a modulated laser. In other words, the laser rangefinder may be configured to measure the distance to the target object. In actual application, the laser rangefinder may include but is not limited to any one or a combination of a plurality of the following elements: a laser source, a laser scanner, and a laser detector.

The camera apparatus 1206 is configured to capture imagery such as a picture and a video. In this application, during driving of the vehicle for after starting of the camera apparatus, the camera apparatus may capture a picture of an environment of the vehicle in real time. For example, in a process in which the vehicle enters or exits a tunnel, the camera apparatus may consecutively capture corresponding pictures in real time. In actual application, the camera apparatus includes but is not limited to an event data recorder, a camera, a video camera, or another element used for photographing/image shooting. A quantity of camera apparatuses is not limited in this application.

The wheel speed sensor 1207 is a sensor configured to detect a wheel speed of the vehicle. A commonly used wheel speed sensor 1207 may include but is not limited to a magnetoelectric wheel speed sensor and a Hall wheel speed sensor. The steering sensor 1208, which may also be referred to as a steering angle sensor, may represent a system for detecting a steering angle of the vehicle. In actual application, the steering sensor 1208 may be configured to measure a steering angle of a steering wheel of the vehicle, or may be configured to measure an electrical signal indicative of the steering angle of the steering wheel of the vehicle. Optionally, the steering sensor 1208 may alternatively be configured to measure a steering angle of a tire of the vehicle, or may be configured to measure an electrical signal indicative of the steering angle of the tire of the vehicle. This is not limited in this application.

In other words, the steering sensor 1208 may be configured to measure any one or a combination of a plurality of the following items: the steering angle of the steering wheel, the electrical signal indicative of the steering angle of the steering wheel, the steering angle of the wheel (the tire of the vehicle), the electrical signal indicative of the steering angle of the wheel, and the like.

The gear sensor 1209 is configured to detect a current gear at which the vehicle travels. Because vehicle manufacturers are different, gears in the vehicle may also be different. A self-driving vehicle is used as an example. The self-driving vehicle supports six gears: P, R, N, D, 2, and L. The P (parking) gear is used for parking. This gear uses a mechanical apparatus of the vehicle to lock a braking part of the vehicle, so that the vehicle cannot move. The R (reverse) gear is also referred to as a reverse gear and is used to reverse the vehicle. The D (drive) gear is also referred to as a forward gear and is used to drive the vehicle on a road. The 2 (second gear) gear is also a forward gear and is used to adjust a driving speed of the vehicle. The 2 gear is usually used to drive the vehicle uphill and downhill. The L (low) gear is also referred to as a low-speed gear and is used to limit the driving speed of the vehicle. For example, on a downhill road, the vehicle enters the L gear, so that the vehicle uses engine power to brake when going downhill. A driver does not need to step on a brake for a long time to cause a danger caused by overheating of a brake pad.

The control system 14 may include a plurality of elements, for example, a steering unit 1401, a brake unit 1402, a lighting system 1403, a self-driving system 1404, a map navigation system 1405, a network time system 1406, and an obstacle avoidance system 1407 shown in the figure. Optionally, the control system 14 may further include elements such as a throttle controller and an engine controller that are configured to control the driving speed of the vehicle. This is not limited in this application.

The steering unit 1401 may represent a system configured to adjust a driving direction of the vehicle 10, and may include but is not limited to the steering wheel, or any other structural device configured to adjust or control the driving direction of the vehicle. The brake unit 1402 may represent a system configured to slow down the driving speed of the vehicle 10, may also be referred to as a vehicle braking system, and may include but is not limited to a brake controller, a decelerator, or any other structural device configured to decelerate the vehicle. In actual application, the brake unit 1402 may slow down the tire of the vehicle through friction, to slow down the driving speed of the vehicle. The lighting system 1403 is configured to provide a lighting function or a warning function for the vehicle. For example, during driving of the vehicle at night, the lighting system 1403 may turn on headlamps and rear lamps of the vehicle, to provide illumination brightness for the driving of the vehicle, and ensure safe driving of the vehicle. In actual application, the lighting system includes but is not limited to the headlamps, the rear lamps, a width lamp, and a warning lamp.

The self-driving system 1404 may include a hardware system and a software system, and is configured to process and analyze data input to the self-driving system 1404, to obtain actual control parameters of the components in the control system 14, for example, expected braking pressure of the brake controller in the brake unit and expected torque of an engine. This facilitates corresponding control by the control system 1404, and ensures the safe driving of the vehicle. Optionally, the self-driving system 1404 may further determine information such as an obstacle to the vehicle and characteristics (for example, a lane in which the vehicle is currently driven, a road boundary, and a traffic light to be passed through) of the environment of the vehicle by analyzing the data. The data input to the self-driving system 1404 may be picture data collected by the camera apparatus, or data collected by the elements in the sensor system 12, for example, the steering angle of the steering wheel provided by the steering angle sensor and the wheel speed provided by the wheel speed sensor. This is not limited in this application.

The map navigation system 1405 is configured to provide map information and a navigation service for the vehicle 10. In actual application, the map navigation system 1405 may plan an optimal driving route, for example, a route with a shortest distance or a relatively low traffic volume, based on positioning information (which may be specifically a current location of the vehicle) of the vehicle provided by the GPS and a destination address input by a user. This facilitates vehicle driving with the aid of navigation based on the optimal driving route, to reach the destination address. Optionally, in addition to providing the navigation function, the map navigation system may further provide or present corresponding map information to the user based on an actual requirement of the user, for example, present a road section for current vehicle driving on a map in real time. This is not limited in this application.

The network time system (NTS) 1406 is configured to provide a time synchronization service, to ensure that a current system time of the vehicle is synchronous with a standard network time, and help provide more accurate time information for the vehicle. In specific implementation, the network time system 1406 may obtain a standard time signal from the GPS satellite, and synchronously update the current system time of the vehicle by using the time signal, to ensure that the current system time of the vehicle is the same as a time corresponding to the obtained standard time signal.

The obstacle avoidance system 1407 is configured to predict an obstacle that possibly appears during driving of the vehicle, and control the vehicle 10 to bypass or leap the obstacle to implement normal driving of the vehicle 10. For example, the obstacle avoidance system 1407 may use the sensor data collected by the elements in the sensor system 12 to analyze and determine an obstacle that possibly appears on a driving road of the vehicle. If the obstacle is relatively large in size, for example, is a fixed construction (storied house) on a roadside, the obstacle avoidance system 1407 may control the vehicle 10 to bypass the obstacle to implement safe driving. If the obstacle is relatively small in size, for example, is a small stone on a roadside, the obstacle avoidance system 1407 may control the vehicle 10 to leap the obstacle, continue driving forward, and the like.

The peripheral device 16 may include a plurality of elements, for example, a communications system 1601, a touchscreen 1602, a user interface 1603, a microphone 1604, and a speaker 1605 in the figure. The communications system 1601 is configured to implement network communication between the vehicle 10 and another device other than the vehicle 10. In actual application, the communications system 1601 may use a wireless communications technology or a wired communications technology to implement network communication between the vehicle 10 and the another device. The wired communications technology may mean using a network cable, an optical fiber, or the like to perform communication between the vehicle and the another device. The wireless communications technology includes but is not limited to a Global System for Mobile communications (GSM), a general packet radio service (GPRS), code-division multiple access (CDMA), wideband CDMA (WCDMA), time-division synchronous CDMA (TD-SCDMA), Long-Term Evolution (LTE), wireless local area network (WLAN) (such as a Wi-Fi network), Bluetooth (BT), a global navigation satellite system (GNSS), frequency modulation (FM), near field communication (NFC), an infrared technology (IR), and the like.

The touchscreen 1602 may be configured to detect an operation instruction on the touchscreen 1602. For example, a user performs, based on an actual requirement, a touch operation on content data displayed on the touchscreen 1602, to implement a function corresponding to the touch operation, for example, play a multimedia file such as music or a video. The user interface 1603 may be a touch panel configured to detect an operation instruction on the touch panel. The user interface 1603 may alternatively be a physical key or a mouse. The user interface 1603 may alternatively be a display configured to output data and display a picture or data. Optionally, the user interface 1603 may alternatively be at least one device, such as a touchscreen, a microphone, or a speaker, that belongs to a peripheral device.

The microphone 1604, also referred to as "mic" or "mike", is configured to convert a sound signal into an electrical signal. When making a call or sending voice information, the user moves close to the microphone to make a sound. In this way, the sound signal can be input to the microphone. The speaker 1605, also referred to as a loudspeaker, is configured to convert an audio electrical signal into a sound signal. For example, music may be played or a hands-free call may be answered in the vehicle through the speaker 1605.

The power supply 18 represents a system used to provide power or energy for the vehicle, and may include but is not limited to a rechargeable lithium battery and lead-acid battery. In actual application, one or more battery modules in the power supply are configured to provide electrical energy or energy for starting the vehicle. A type and a material of the power supply are not limited in this application. Optionally, the power supply 18 may be an energy source, and is configured to provide energy for the vehicle, for example, petrol, diesel fuel, anhydrous alcohol, a solar cell, or a solar panel. This is not limited in this application.

Several functions of the vehicle 10 are all implemented through control by the computer system 20. The computer system 20 may include one or more processors 2001 (one processor is shown as an example in the figure) and a memory 2002 (which may also be referred to as a storage apparatus). In actual application, the memory 2002 is inside the computer system 20, or may be outside the computer system 20, for example, may be used as a cache in the vehicle 10. This is not limited in this application. Details are as follows:

The processor 2001 may include one or more general-purpose processors, for example, a graphics processing unit (GPU). The processor 2001 may be configured to run a related program stored in the memory 2002 or instructions corresponding to a program, to implement a corresponding function of the vehicle.

The memory 2002 may include a volatile memory, for example, a random-access memory (RAM). The memory may alternatively include a non-volatile memory, for example, a read-only memory (ROM), a flash memory, a hard disk drive (HDD), or a solid-state drive (SSD). The memory 2002 may alternatively include a combination of the foregoing types of memories. The memory 2002 may be configured to store a set of program code or instructions corresponding to program code, so that the processor 2001 invokes the program code or the instructions stored in the memory 2002 to implement a corresponding function of the vehicle. The function includes but is not limited to some or all functions in the schematic diagram of the functional framework of the vehicle shown in FIG. 11. In this application, the memory 2002 may store a set of program code used to control the vehicle. The processor 2001 may control safe driving of the vehicle by invoking the program code. A manner of implementing safe driving of the vehicle is described in detail below in this application.

Optionally, in addition to storing the program code or instructions, the memory 2002 may further store information such as a road map, a driving route, and sensor data. The computer system 20 may implement a vehicle-related function in combination with other elements in the schematic diagram of the functional framework of the vehicle, such as the sensor and the GPS in the sensor system. For example, the computer system 20 may control the driving direction or the driving speed of the vehicle 10 based on data input of the sensor system 12. This is not limited in this application.

The head-up display system 22 may include a plurality of elements, for example, a windshield 2201, a controller 2202, and a head-up display 2203 shown in the figure. The controller 2202 is configured to generate a picture based on a user instruction, and send the picture to the head-up display 2203 The head-up display 2203 may include a picture generation unit, a removable lens combination, and a reflector combination. The windshield is configured to cooperate with the head-up display to implement an optical path of the head-up display system, so that a target picture is displayed in front of a driver. It should be noted that functions of some elements in the head-up display system may alternatively be implemented by another subsystem of the vehicle. For example, the controller 2202 may alternatively be an element in the control system.

FIG. 11 in this application shows that four subsystems are included. The sensor system 12, the control system 14, the computer system 20, and the head-up display system 22 are merely examples, and do not constitute a limitation. In actual application, the vehicle 10 may combine several elements in the vehicle based on different functions, to obtain subsystems with corresponding different functions. For example, the vehicle 10 may further include an electronic stability program (ESP) system, an electric power steering (EPS) system, and the like, which are not shown in the figure. The ESP system may include some sensors in the sensor system 12 and some elements in the control system 14. Further, the ESP system may include the wheel speed sensor 1207, the steering sensor 1208, a transverse acceleration sensor, a control unit in the control system 14, and the like. The EPS system may include elements such as some sensors in the sensor system 12, some elements in the control system 14, and the power supply 18. Further, the EPS system may include the steering sensor 1208, a generator and a reducer in the control system 14, a battery power supply, and the like. For another example, the head-up display system may also include the user interface 1603 and the touchscreen 1602 in the peripheral device, to implement a function of receiving a user instruction. The head-up display system may further include a camera unit in the sensor system configured to cooperate with the controller 2203 to generate a picture. For example, the camera unit sends the picture to the controller 2203.

It should be noted that FIG. 11 is merely a possible schematic diagram of the functional framework of the vehicle 10. In actual application, the vehicle 10 may include more or fewer systems or elements. This is not limited in this application.

The vehicle 10 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

Figure 12:
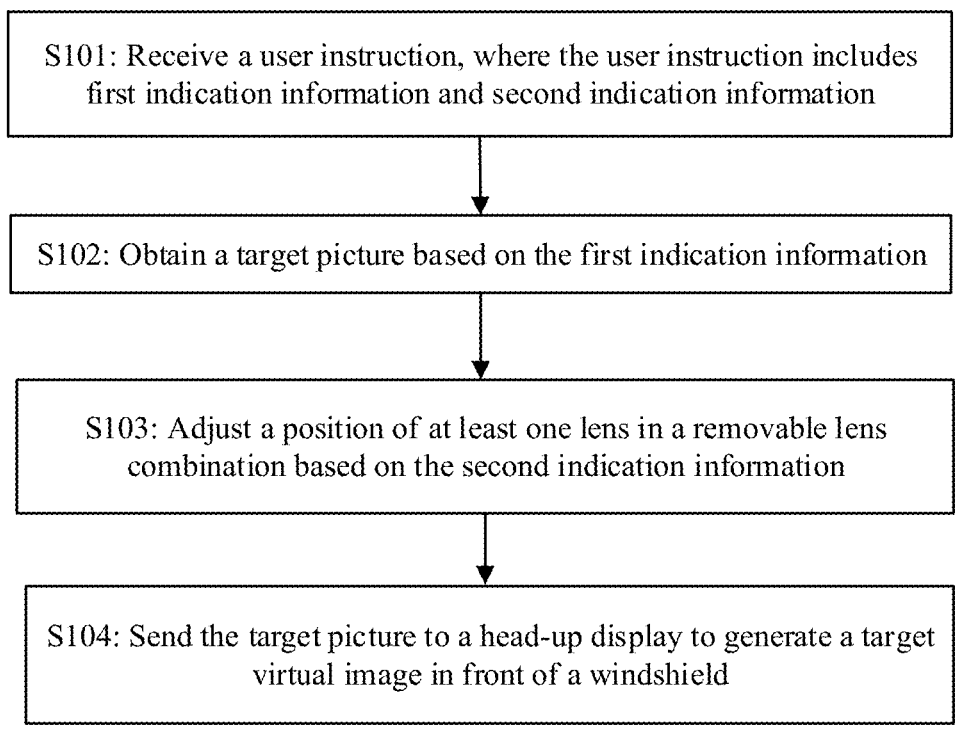
FIG. 12 is a schematic flowchart of a head-up display method according to an embodiment of this application.

With reference to FIG. 12, the following specifically describes a head-up display method according to an embodiment of this application. The method may be performed by a controller in a head-up display system. As shown in FIG. 12, the head-up display method includes some or all of the following steps:

S101: Receive a user instruction. The user instruction includes first indication information and second indication information.

The first indication information indicates picture content. The second indication information indicates a position of a removable lens. Further, a controller may provide an interface for a user to input an instruction. For example, the controller may provide a display. Correspondingly, the user may input the user instruction through the display. For another example, the controller may provide a microphone configured to receive a voice instruction of the user. The instruction may be a selection mode. For example, one mode may correspond to two pieces of indication information. The first indication information corresponding to a single-focus mode may indicate that a picture is a single picture. The second indication information corresponding to the single-focus mode may indicate that the position of the removable lens is outside an optical path of a head-up display. For another example, two modes may be a navigation mode and an entertainment mode. The navigation mode may correspond to two image planes. One image plane is used to display dashboard information, and the other image plane is used to display road surface navigation information. The entertainment mode may correspond to one image plane.

S102: Obtain a target picture based on the first indication information.

Further, the controller may obtain one or two pictures. This is not limited herein. For example, the first indication information indicates to generate two pictures. One picture is dashboard information, and the other picture is vehicle navigation line information. In this case, the controller may collect data such as a vehicle speed, and generate a dashboard picture based on the data. In addition, the controller may collect scenario data in a process of driving the vehicle through a camera, and then generate a vehicle navigation line picture based on the scenario data. For another example, if the first indication information indicates to generate a video picture, the controller may obtain video data. It may be understood that the video data includes a plurality of video frames. The plurality of video frames indicated by the first indication information is the target picture.

S103: Adjust a position of at least one lens in a removable lens combination based on the second indication information.

Further, the controller may first identify a position of each lens in the removable lens combination, and then adjust the position of the lens in the removable lens combination based on the second indication information. The second indication information may be one user operation, or may include two user operations. For example, a first user operation is used to adjust a position of a first lens, and a second user operation is used to adjust a position of a second lens.

For example, if the second indication information indicates that the removable lens combination is inserted into a target position. The target position is located between a picture generation unit and a reflector combination or between two optical elements in the reflector combination. The controller may first identify whether the removable lens combination is at the target position. If the removable lens combination is not at the target position, the controller inserts the removable lens combination into the target position.

In some embodiments, a structure of the head-up display is shown in FIG. 5. The head-up display includes the picture generation unit, the removable lens combination, and the reflector combination. The removable lens combination may include a first convex lens and a second convex lens. Further, the controller may receive the input first user operation, and insert the first lens between the first light-emitting region and the reflector combination or remove the first lens from between the first light-emitting region and the reflector combination in response to the first user operation. The controller may further receive the input second user operation, and insert the second lens between the second light-emitting region and the reflector combination or remove the second lens from between the second light-emitting region and the reflector combination in response to the second user operation. For example, the controller may insert the first convex lens and the second convex lens into positions shown in FIG. 6B based on the second indication information. As shown in the figure, the controller inserts a lower half part of the first convex lens into the first optical path. The first optical path deflects upward. After passing through the lower half part of the first convex lens, a first picture formed by the part B of the PGU is finally imaged on the screen B. An optical path through which the optical system projects the first picture into a first virtual image is the first optical path. The controller further inserts an upper half part of the second convex lens into the second optical path. The second optical path deflects downward. After passing through the upper half part of the second convex lens, a second picture formed by the part A of the PGU is finally imaged on the screen A. An optical path through which the optical system projects the second picture into a second virtual image is the second optical path. It may be understood that because focal lengths of the first convex lens and the second convex lens are different, the first picture and the second picture are imaged on different image planes. In addition, a principle of deflecting light rays at different positions of the convex lens is used, so that the optical paths through which the first picture and the second picture pass deflect, to ensure that the first picture and the second picture do not overlap.

S104: Send the target picture to the head-up display to generate a target virtual image in front of a windshield.

Further, the controller sends the target picture to the picture generation unit in the head-up display. For detailed content of generating the target virtual image of the target picture in front of the windshield through the head-up display, refer to the foregoing related descriptions. Details are not described herein again.

It should be noted that S103 and S104 may be performed sequentially or simultaneously. This is not limited herein.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A head-up display, comprising:
a picture generator configured to:
output a first light ray to display a first picture; and
output a second light ray to display a second picture; and
a first lens configured to move from a first position to a second position,
wherein when the first lens is at the first position, the first light ray and the second light ray do not pass through the first lens, and
wherein when the first lens is at the second position, the first light ray passes through the first lens so that a visual distance of a virtual image of the first picture is not equal to a visual distance of a virtual image of the second picture.

2. The head-up display of claim 1, further comprising a second lens configured to move from a third position to a fourth position, wherein when the second lens is at the third position and the first lens is at the first position, the first light ray and the second light ray do not pass through the second lens so that the visual distance of the virtual image of the first picture is equal to the visual distance of the virtual image of the second picture, and wherein when the second lens is at the fourth position, the second light ray passes through the second lens so that the visual distance of the virtual image of the first picture is not equal to the visual distance of the virtual image of the second picture.

3. The head-up display of claim 2, wherein a focal length of the first lens is not equal to a focal length of the second lens, wherein the visual distance of the virtual image of the first picture that is displayed when the first lens is at the first position and the second lens is at the third position is greater than the visual distance of the virtual image of the first picture that is displayed when the first lens is at the second position, and wherein the visual distance of the virtual image of the first picture that is displayed when the first lens is at the first position and the second lens is at the third position is less than the visual distance of the virtual image of the second picture that is displayed when the second lens is at the fourth position.

4. The head-up display of claim 3, further comprising a reflector combination located between the picture generator and a windshield and configured to:
reflect the first light ray to the windshield, wherein the virtual image of the first picture is displayed on a side that is of the windshield and that is away from the reflector combination; and
reflect the second light ray to the windshield, wherein the virtual image of the second picture is displayed on the side that is of the windshield and that is away from the reflector combination.

5. The head-up display of claim 1, wherein the first lens is a convex lens, and wherein when the first lens is at the second position, an optical center of the first lens is located outside an optical path formed by the first light ray.

6. The head-up display of claim 2, wherein the second lens is a convex lens, and wherein when the second lens is at the fourth position, an optical center of the second lens is located outside an optical path formed by the second light ray.

7. The head-up display of claim 4, wherein the reflector combination comprises:
a first reflector comprising:
a convex plane facing the picture generator; and
a surface that is away from the picture generator and comprising a reflective coating; and
a second reflector comprising:
a concave plane facing the first reflector; and
a surface that is away from the first reflector and comprising a reflective coating,
wherein the first reflector is configured to reflect both the first light ray and the second light ray to the second reflector and wherein the second reflector is configured to reflect both the first light ray and the second light ray to the windshield.

8. The head-up display of claim 7, further comprising a third reflector configured to reflect the first light ray to the reflector combination.

9. The head-up display of claim 2, further comprising a controller comprising:
one or more memories configured to store computer instructions; and
one or more processors coupled to the one or more memories and configured to execute the computer instructions to cause the head-up display to:
receive a first user input operation; and
drive, in response to the first user input operation, the first lens to move from the first position to the second position or drive the first lens to move from the second position to the first position.

10. The head-up display of claim 9, wherein the one or more processors are further configured to execute the computer instructions to cause the head-up display to:
receive a second user input operation; and
drive, in response to the second user input operation, the second lens to move from the third position to the fourth position or drive the second lens to move from the fourth position to the third position.

11. A vehicle, comprising:
a head-up display comprising:
a picture generator configured to:
output a first light ray to display a first picture; and
output a second light ray to display a second picture; and
a first lens configured to move from a first position to a second position,
wherein when the first lens is at the first position, the first light ray and the second light ray do not pass through the first lens, and
wherein when the first lens is at the second position, the first light ray passes through the first lens so that a visual distance of a virtual image of the first picture is not equal to a visual distance of a virtual image of the second picture.

12. A head-up display method applied to a head-up display system and comprising:
obtaining, by a controller, a first picture and a second picture;
receiving, by a picture generator, the first picture and the second picture from the controller;
outputting, by the picture generator, a first light ray and a second light ray;
reflecting, by a reflector combination located between the picture generator and a windshield, the first light ray to the windshield to display a first virtual image of the first picture on the windshield or the second light ray to the windshield to display a second virtual image of the second picture on the windshield;
receiving, by the controller, a first user input operation;
moving, in response to the first user input operation, a first lens from a first position to a second position or the first lens from the second position to the first position;
not passing, when the first lens is at the first position, the first light ray and the second light ray through the first lens so that a visual distance of the first virtual image of the first picture is equal to a visual distance of the second virtual image of the second picture; and
passing, when the first lens is at the second position, the first light ray through the first lens so that the visual distance of the first virtual image of the first picture is not equal to the visual distance of the second virtual image of the second picture.

13. The head-up display method of claim 12, further comprising:
receiving, by the controller, a second user input operation; and
driving, in response to the second user input operation, a second lens to move from a third position to a fourth position or driving the second lens to move from the fourth position to the third position;
not passing, when the second lens is at the third position and the first lens is at the first position, the first light ray and the second light ray through the first lens and the second lens so that the visual distance of the first virtual image of the first picture is equal to the visual distance of the second virtual image of the second picture; and
passing, when the second lens is at the fourth position, the second light ray through the second lens so that the visual distance of the first virtual image of the first picture is not equal to the visual distance of the second virtual image of the second picture.

14. The head-up display method of claim 13, wherein a focal length of the first lens is not equal to a focal length of the second lens, wherein the visual distance of the first virtual image of the first picture that is displayed when the first lens is at the first position and the second lens is at the third position is greater than the visual distance of the first virtual image of the first picture that is displayed when the first lens is at the second position, and wherein the visual distance of the first virtual image of the first picture that is displayed when the first lens is at the first position and the second lens is at the third position is less than the visual distance of the second virtual image of the second picture that is displayed when the second lens is at the fourth position.

15. The head-up display method of claim 13, wherein the second lens is a convex lens, and wherein when the second lens is at the fourth position, an optical center of the second lens is located outside an optical path formed by the second light ray.

16. The head-up display method of claim 12, wherein the reflector combination comprises a first reflector and a second reflector, and wherein the head-up display method further comprises:
reflecting, by the first reflector, the first light ray and the second light ray to the second reflector; and
reflecting, by the second reflector, the first light ray and the second light ray to the windshield.

17. The head-up display method of claim 16, further comprising reflecting, by a third reflector, the first light ray to the reflector combination.

18. The head-up display method of claim 12, wherein the first lens is a convex lens, and wherein when the first lens is at the second position, an optical center of the first lens is located outside an optical path formed by the first light ray.

19. The head-up display method of claim 12, further comprising operating the head-up display system in a vehicle.

20. The head-up display method of claim 19, further comprising obtaining, by the controller, the first picture and the second picture, wherein the first picture comprises dashboard information based on vehicle information of the vehicle, and wherein the second picture comprises vehicle navigation information based on scenario data captured by a camera of the vehicle.

* * * * *